(12) United States Patent
Hwang et al.

(10) Patent No.: US 11,968,037 B2
(45) Date of Patent: Apr. 23, 2024

(54) METHOD AND APPARATUS FOR TRANSMITTING OR RECEIVING WIRELESS SIGNAL IN WIRELESS COMMUNICATION SYSTEM

(71) Applicant: LG ELECTRONICS INC., Seoul (KR)

(72) Inventors: Seunggye Hwang, Seoul (KR); Changhwan Park, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 581 days.

(21) Appl. No.: 17/267,194

(22) PCT Filed: Aug. 9, 2019

(86) PCT No.: PCT/KR2019/010072
§ 371 (c)(1),
(2) Date: Feb. 9, 2021

(87) PCT Pub. No.: WO2020/032682
PCT Pub. Date: Feb. 13, 2020

(65) Prior Publication Data
US 2021/0314084 A1    Oct. 7, 2021

Related U.S. Application Data

(60) Provisional application No. 62/716,948, filed on Aug. 9, 2018, provisional application No. 62/808,880, filed on Feb. 22, 2019.

(30) Foreign Application Priority Data

Nov. 2, 2018  (KR) .................. 10-2018-0133974
May 3, 2019   (KR) .................. 10-2019-0052513

(51) Int. Cl.
  *H04L 1/1812*   (2023.01)
  *H04L 1/00*     (2006.01)
  (Continued)

(52) U.S. Cl.
  CPC .......... *H04L 1/0027* (2013.01); *H04L 1/1819* (2013.01); *H04L 1/1825* (2013.01);
  (Continued)

(58) Field of Classification Search
  CPC . H04L 1/00; H04L 1/0027; H04L 1/18; H04L 1/1819; H04L 1/1825;
  (Continued)

(56) References Cited

U.S. PATENT DOCUMENTS 9,584,265 B2 *  2/2017  Yang ................ H04L 5/001
10,911,188 B2 * 2/2021  Chen ................ H04L 1/1825
(Continued)

FOREIGN PATENT DOCUMENTS

CN        103891182       6/2014
KR     10-2012-0123623   11/2012
(Continued)

OTHER PUBLICATIONS

Bergman et al., Further enhanced MTC for LTE, 3GPP TSG RAN meeting #75, RP-170462, 19 pages, Mar. 6-9, 2017.*

(Continued)

*Primary Examiner* — Frank Duong
(74) *Attorney, Agent, or Firm* — LEE, HONG, DEGERMAN, KANG & WAIMEY

(57) ABSTRACT

The present invention relates to a wireless communication system and, more specifically, to a method and an apparatus therefor, the method comprising the steps of: receiving information for scheduling a plurality of transport blocks (TBs); receiving the plurality of TBs on the basis of the information; and transmitting HARQ-ACK information
(Continued)

relating to the plurality of TBs, wherein whether HARQ-ACK bundling is applied and/or a structure in which HARQ-ACK bundling is applied is determined on the basis of a specific condition. The UE is capable of communicating with at least one of another UE, a UE related to an autonomous driving vehicle, a base station or a network.

7 Claims, 34 Drawing Sheets

(51) Int. Cl.
    *H04L 1/1825*      (2023.01)
    *H04L 1/1867*      (2023.01)
    *H04W 4/40*      (2018.01)
    *H04W 8/24*      (2009.01)

(52) U.S. Cl.
    CPC .............. *H04L 1/1896* (2013.01); *H04W 4/40* (2018.02); *H04W 8/24* (2013.01)

(58) Field of Classification Search
    CPC ....... H04L 1/1854; H04L 1/1896; H04L 5/00; H04L 5/0055; H04W 4/40; H04W 8/24
    See application file for complete search history.

(56) References Cited

U.S. PATENT DOCUMENTS

| | | | |
|---|---|---|---|
| 11,356,828 | B2 * | 6/2022 | Ye .......................... H04W 24/08 |
| 2012/0039279 | A1 | 2/2012 | Chen et al. |
| 2014/0233541 | A1 | 8/2014 | Kim et al. |
| 2014/0369290 | A1 | 12/2014 | Yang et al. |
| 2015/0003425 | A1 | 1/2015 | Kim et al. |
| 2019/0081762 | A1 * | 3/2019 | Yang ..................... H04L 1/1812 |

FOREIGN PATENT DOCUMENTS

| | | | |
|---|---|---|---|
| WO | 2016123372 | | 8/2016 |
| WO | WO 2018/145074 | * | 8/2018 |

OTHER PUBLICATIONS

ZTE, Sanechips, HARQ-ACK multiplexing and bundling, 3GPP TSG RAN WG1 Meeting 90bis, R1-1717041, 10 pages, Oct. 2017.*
Huawei, HiSilicon, On HARQ-ACK bundling in HD-FDD, 3GPP TSG RAN WG1 Meeting #88, R1-1701762, 6 pages, Feb. 2017.*
Qualcomm Incorporated, Support of HARQ-ACK bundling in HD-FDD, 3GPP TSG RAN WG1 Meeting #88, R1-1702541, 3 pages, Feb. 2017.*
GPP TS 36.213 V10.1.0, 3rd Generation Partnership Project; Technical Specification Group Radio Access Network; Evolved Universal Terrestrial Radio Access (E-UTRA); Physical layer procedures (Release 10), 115 pages, Mar. 2011.*
PCT International Application No. PCT/KR2019/010072, International Search Report dated Dec. 3, 2019, 18 pages.
Huawei et al., "HARQ timing, multiplexing, bundling, processing time and number of processes," R1-1717075, 3GPP TSG RAN WG1 Meeting 90bis, Oct. 2017, 12 pages.
LG Electronics, "Considerations on HARQ process and feedback for NR," R1-1715886, 3GPP TSG RAN WG1 Meeting NR#3, Sep. 2017, 16 pages.
OPPO, "Remaining issues on HARQ-ACK bundling," R1-1800769, 3GPP TSG RAN WG1 Meetng AH 1801, Jan. 2018, 5 pages.
European Patent Office Application Serial No. 19846210.3, Search Report dated Mar. 22, 2022, 11 pages.
Ericsson et al., "Further enhanced MTC for LTE," RP-170462, 3GPP TSG RAN meeting #75, Mar. 2017, 19 pages.
European Patent Office Application Serial No. 19846210.3, Search Report dated Jun. 7, 2022, 8 pages.
Huawei et al., "Layer mapping for 4-branch MIMO," R1-113847, 3GPP TSG-RAN WG1 Meeting #67, Nov. 2011, 7 pages.
The State Intellectual Property Office of the People's Republic of China Application Serial No. 201980058739.9, Office Action dated Jul. 18, 2023, 17 pages.
The State Intellectual Property Office of the People's Republic of China Application Serial No. 201980058739.9, Notice of Allowance dated Sep. 12, 2023, 6 pages.

* cited by examiner (a)

(b)

(a) In-band system (b) Guard-band system (c) Stand-alone system (a) Preamble symbol group (b) Preamble transmission (a)

(b)

(c)

(a)

(b)

METHOD AND APPARATUS FOR TRANSMITTING OR RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2019/010072, filed on Aug. 9, 2019, which claims the benefit of U.S. Provisional Application Nos. 62/716,948 filed on Aug. 9, 2018, and 62/808,880 filed on Feb. 22, 2019, and also claims the benefit of earlier filing date and right of priority to Korean Application Nos. 10-2018-0133974 filed on Nov. 2, 2018, and 10-2019-0052513 filed on May 3, 2019, the contents of which are all incorporated by reference herein in their entirety.

TECHNICAL FIELD

The present disclosure relates to a wireless communication system, and more particularly, to a method and apparatus for transmitting or receiving HARQ-ACK.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

A technical task of the present disclosure is to provide a method for transmitting or receiving a radio signal and an apparatus therefor, and more specifically, to provide a method and apparatus for efficiently transmitting or receiving HARQ-ACK information.

Technical tasks obtainable from the present disclosure are not limited to the above-mentioned technical task. And, other unmentioned technical tasks can be clearly understood from the following description by those having ordinary skill in the art to which the present disclosure pertains.

Technical Solution

In one aspect of the present disclosure, provided herein is a method for transmitting a signal by a terminal in a wireless communication system, the method including receiving information for scheduling a plurality of transport blocks (TBs), receiving the plurality of TBs based on the information, and transmitting HARQ-ACK information for the plurality of TBs, wherein, based on a specific condition, whether to apply HARQ-ACK bundling and/or a structure for application of the HARQ-ACK bundling is determined.

In another aspect of the present disclosure, provided herein is a terminal for transmitting and receiving a signal in a wireless communication system, the terminal including a transceiver configured to receive or transmit a signal, and a processor configured to control the transceiver, wherein the processor is configured to receive information for scheduling a plurality of transport blocks (TBs), receive the plurality of TBs based on the information, and transmit HARQ-ACK information for the plurality of TBs, wherein, based on a specific condition, whether to apply HARQ-ACK bundling and/or a structure for application of the HARQ-ACK bundling is determined.

In another aspect of the present disclosure, provided herein is an apparatus for a user equipment for receiving a downlink signal in a wireless communication system, the apparatus including a memory containing executable code, and a processor connected to the memory for operation, wherein the processor is configured to execute the executable code to perform specific operations, the specific operations including receiving information for scheduling a plurality of transport blocks (TBs), receiving the plurality of TBs based on the information, and transmitting HARQ-ACK information for the plurality of TBs, wherein, based on a specific condition, whether to apply HARQ-ACK bundling and/or a structure for application of the HARQ-ACK bundling is determined.

When the specific condition satisfies a condition for applying the HARQ-ACK bundling, the HARQ-ACK information may include one bit information generated by applying the HARQ-ACK bundling. When the specific condition does not satisfy the condition for applying the HARQ-ACK bundling, the HARQ-ACK information may include individual HARQ-ACK responses to the plurality of TBs.

The specific condition may include the plurality of TBs being received in an alternating manner. When the plurality of TBs is received in the alternating manner, the HARQ-ACK bundling is applied for transmission of the HARQ-ACK information. When the plurality of TBs is not received in the alternating manner, applying the HARQ-ACK bundling may be skipped for transmission of the HARQ-ACK information.

The specific condition may include the plurality of TBs being received in an alternating manner. When the plurality of TBs is received in the alternating manner, the HARQ-ACK information may include one bit information generated by applying the HARQ-ACK bundling to the plurality of TBs. When the plurality of TBs is not received in the alternating manner, the HARQ-ACK information may include M bit information generated by grouping the plurality of TBs into M sub-groups and applying the HARQ-ACK bundling to each of the sub-groups, wherein M may be a positive integer.

The specific condition may include the number of the plurality of TB being greater than a specific number. When the number of the plurality of TBs is less than or equal to the specific number, the HARQ-ACK information may include individual HARQ-ACK responses to the plurality of TBs. When the number of the plurality of TBs is greater than the specific number, the HARQ-ACK information may be generated by applying the HARQ-ACK bundling.

The specific number may be 4.

When the number of the plurality of TBs is greater than the specific number, the HARQ-ACK information may be generated by grouping the plurality of TBs into a specific number of sub-groups and applying the HARQ-ACK bundling to each of the sub-groups.

The specific number may be 2.

When the number of the plurality of TBs is greater than the specific number, the HARQ-ACK information may be generated by applying the HARQ-ACK bundling to an entirety of the plurality of TBs.

The specific condition may include HARQ-ACK transmission time intervals for different TBs among the plurality of TBs overlapping each other. When the HARQ-ACK transmission time intervals for the different TBs among the plurality of TBs overlap each other, the HARQ-ACK information may be generated by applying the HARQ-ACK bundling. When the HARQ-ACK transmission time intervals for the different TBs among the plurality of TBs do not overlap each other, the HARQ-ACK information may be generated without applying the HARQ-ACK bundling.

Advantageous Effects

According to the present disclosure, HARQ-ACK transmission and reception may be efficiently performed in a wireless communication system.

Effects obtainable from the present disclosure may not be limited by the above mentioned effect. And, other unmentioned effects can be clearly understood from the following description by those having ordinary skill in the art to which the present disclosure pertains.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

MODE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

For clarity and brevity, description will be made based on a 3GPP communication system (e.g., LTE, NR), but the technical idea of the present disclosure is not limited thereto. LTE refers to the technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to the technology after TS 38.xxx Release 15. LTE/NR may be referred to as a 3GPP system. "xxx" specifies a standard document number. LTE/NR may be collectively referred to as a 3GPP system. Background art, terms, abbreviations, and the like used in the present disclosure may refer to the content described in standard documents published before the present disclosure.

1. Overview of 3GPP System

1.1. Physical Channels and General Signal Transmission

Figure 1:
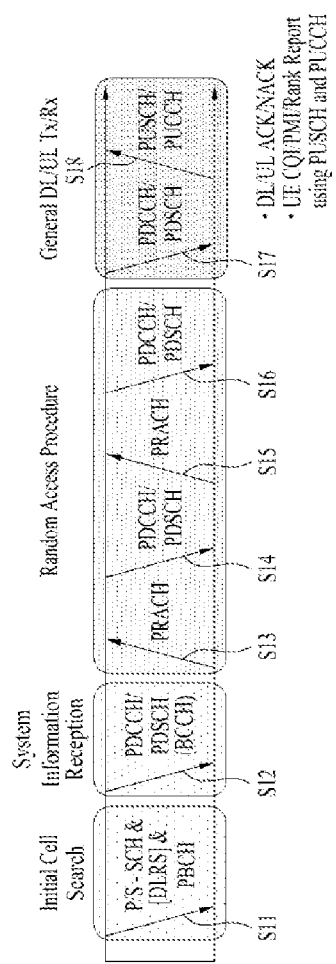
FIG. 1 is a diagram illustrating physical channels that may be used in various embodiments of the present disclosure and a signal transmission method using the same.

FIG. 1 is a diagram illustrating physical channels used in various embodiments of the present disclosure and a signal transmission method using the same.

In a wireless communication system, a terminal (UE) receives information from a base station on a downlink (DL), and transmits information to the base station on an uplink (UL). The information transmitted and received by the base station and the UE includes data and various kinds of control information. There are various physical channels according to the types/uses of the information transmitted and received.

When a UE is powered on again from a power-off state or enters a new cell, the UE performs an initial cell search procedure, such as acquisition of synchronization to a BS (S11). To this end, the UE establishes synchronization with the BS by receiving a primary synchronization channel (P-SCH) and a secondary synchronization channel (S-SCH) from the BS and acquires information such as a cell identity (ID). Then the UE may acquire information broadcast in a cell by receiving a PBCH signal from the BS. In the initial cell search procedure, the UE may monitor a DL channel status by receiving a DL RS.

Upon completion of the initial cell search procedure, the UE may acquire more detailed system information by receiving a PDCCH and a PDSCH according to information carried on the PDCCH (S12).

Next, the UE may perform a random access procedure in order to complete access to the BS (S13 to S16). To this end, the UE may transmit a preamble through a PRACH (S13) and receive a random access response (RAR) to the preamble through the PDCCH and the PDSCH corresponding to the PDCCH (S14). The UE may transmit a PUSCH using scheduling information in the RAR (S15) and perform a contention resolution procedure such as reception of a PDCCH signal and reception of a PDSCH signal corresponding to the PDCCH signal (S16).

The UE that has performed the above-described procedure may receive a PDCCH signal and/or a PDSCH signal (S17) and/or transmit a PUSCH signal and/or a PUCCH signal (S18), as a general UL/DL signal transmission procedure. Control information that the UE transmits to the BS is collectively referred to as UCI. The UCI includes HARQ-ACK/NACK, scheduling request (SR), CQI, PMI, and RI information. Generally, the UCI is periodically transmitted through the PUCCH. However, when control information and data should be simultaneously transmitted, the UCI may be transmitted through the PUSCH. In addition, the UE may aperiodically transmit the UCI through the PUSCH according to the request/indication of a network.

The configuration described above is applicable even to MTC or NB-IoT.

1.2. Radio Frame Structure

Figure 2:
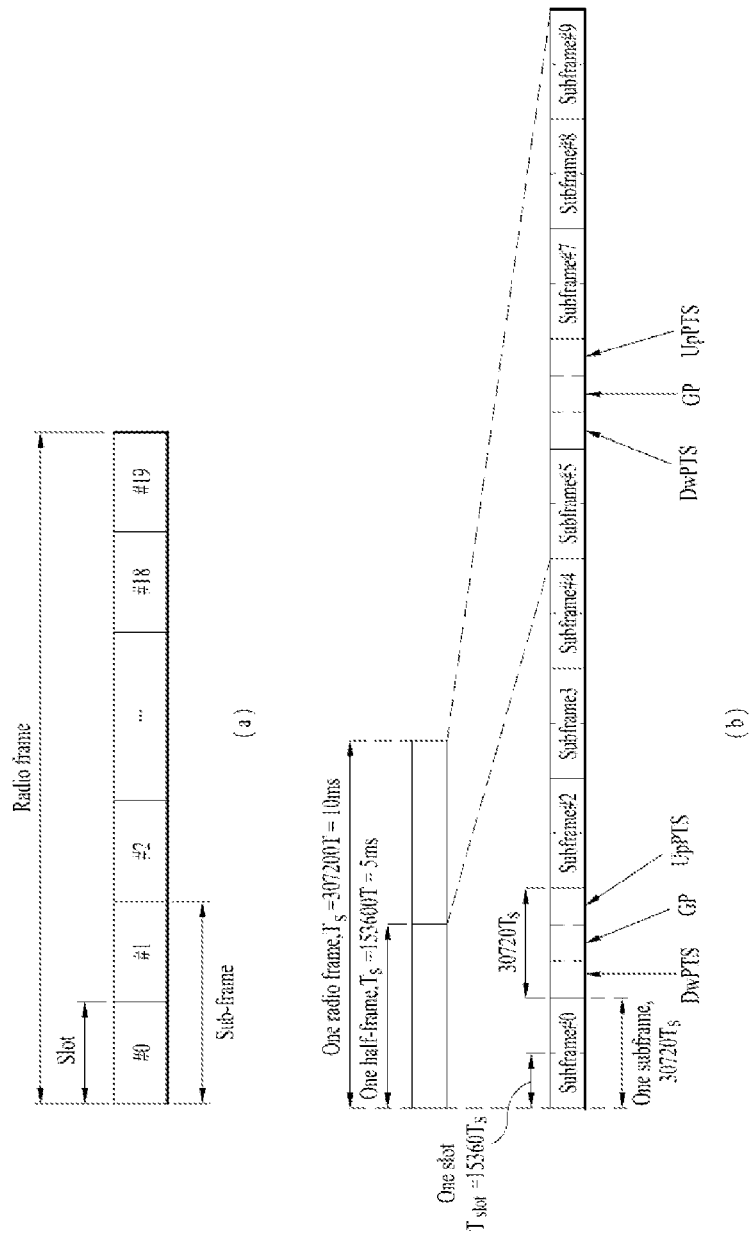
FIG. 2 illustrates a structure of an LTE radio frame.

FIG. 2 illustrates an LTE radio frame structure.

LTE supports frame type 1 for frequency division duplex (FDD), frame type 2 for time division duplex (TDD), and frame type 3 for unlicensed cell (UCell). Up to 31 secondary cells (SCells) may be aggregated in addition to a primary cell (PCell). Unless otherwise specified, operations described below may be independently applied for each cell. In aggregating multiple cells, different frame structures may be used for different cells. Time resources (e.g., subframes, slots, subslots) in the frame structure may be collectively referred to as a time unit (TU).

FIG. 2(a) illustrates frame type 1. A downlink radio frame is defined as 10 1 ms subframes (SFs). An SF includes 14 or 12 symbols according to a cyclic prefix (CP). When a normal CP is used, an SF includes 14 symbols. When an extended CP is used, an SF includes 12 symbols. A symbol may represent an OFDM(A) symbol or an SC-FDM(A) symbol depending on a multiple access scheme. For example, the symbol may represent an OFDM(A) symbol on DL and represent an SC-FDM(A) symbol on UL. The OFDM(A) symbol may be referred to as a cyclic prefix-OFDM(A) (CP-OFDM(A)) symbol, and the SC-FDM(A) symbol may be referred to as a discrete Fourier transform-spread-OFDM (A) (DFT-s-OFDM(A)) symbol.

A subframe may be defined as one or more slots according to subcarrier spacing (SCS) as follows.

When SCS=7.5 kHz or 15 kHz, subframe #i is defined as two 0.5 ms slots #2i and #2i+1 (where i=0 to 9).

When SCS=1.25 kHz, subframe #i is defined as one 1 ms slot #2i.

When SCS=15 kHz, subframe #i may be defined as 6 subslots as exemplarily shown in Table 1.

Table 1 shows an example of the subslot configuration in a subframe (with the normal CP).

TABLE 1

| | Subslot number | | | | | |
|---|---|---|---|---|---|---|
| | 0 | 1 | 2 | 3 | 4 | 5 |
| Slot number | | 2i | | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 2(b) illustrates frame type 2. Frame type 2 consists of two half frames. Each half frame includes 4 (or 5) normal subframes and 1 (or 0) special subframe. The normal subframes are used for UL or DL according to UL-DL configuration. A subframe is composed of two slots.

Table 2 shows an example of the subframe configuration in a radio frame according to UL-DL configurations.

TABLE 2

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 2-continued

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

Here, D denotes a DL subframe, U denotes a UL subframe, and S denotes a special subframe. The special subframe includes a downlink pilot timeslot (DwPTS), a guard period (GP), and an uplink pilot timeslot (UpPTS). The DwPTS is used for initial cell search, synchronization, or channel estimation in a UE, whereas the UpPTS is used for channel estimation in a BS and uplink transmission synchronization in a UE. The GP is a period provided between a downlink and an uplink, for eliminating interference with the uplink caused by multi-path delay of a downlink signal.

Table 3 shows an example of the configuration of the special subframe.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Here, X is set by a higher layer (e.g., RRC) signal or is given as 0.

Figure 3:
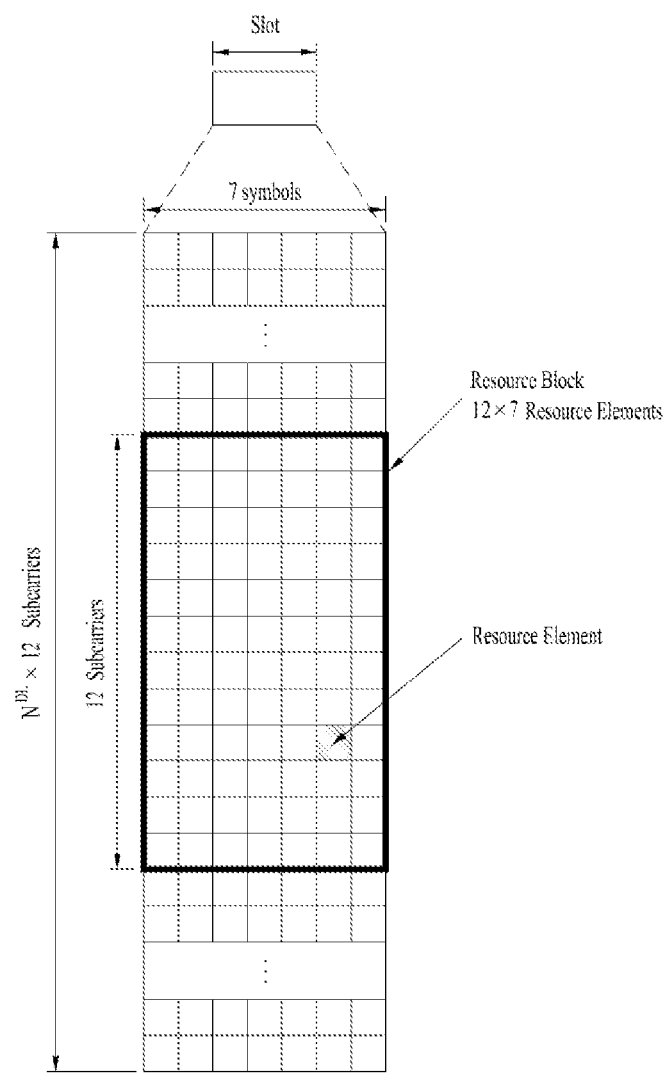
FIG. 3 illustrates a slot structure of an LTE frame.

FIG. 3 illustrates a slot structure of an LTE frame.

Referring to FIG. 3, a slot includes a plurality of symbols in the time domain and a plurality of resource blocks (RBs) in the frequency domain. A symbol represents a symbol period. The slot structure may be represented by a resource grid composed of $N^{DL/UL}_{RB} \times N^{RB}_{sc}$ subcarriers and $N^{DL/UL}_{symb}$ symbols. Here, $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL bandwidth and a UL bandwidth, respectively. $N^{DL}_{symb}$ denotes the number of symbols in the DL slot and $N^{UL}_{symb}$ denotes the number of symbols in the UL slot. In addition, $N^{RB}_{sc}$ denotes the number of subcarriers constituting one RB. The number of symbols in a slot may vary according to the length of the SCS and CP (see Table A1). For example, a slot includes 7 symbols in the case of normal CP, whereas a slot includes 6 symbols in the case of extended CP.

An RB is defined as $N^{DL/UL}_{symb}$ (e.g. 7) consecutive symbols in the time domain and defined as $N^{RB}_{sc}$ (e.g. 12) consecutive subcarriers in the frequency domain. Here, the RB may represent a physical resource block (PRB) or a virtual resource block (VRB), and the PRB and VRB may be mapped in a one-to-one correspondence manner. Two RBs positioned one in each of two slots of a subframe are referred to as an RB pair. Two RBs constituting an RB pair have the same RB number (also referred to as an RB index). A resource composed of one symbol and one subcarrier is referred to a resource element (RE) or tone. Each RE within a resource grid may be uniquely defined by an index pair (k, 1) within one slot. k is an index ranging from 0 to $N^{DL/UL}_{RB} \times N^{RB}_{sc} - 1$ in the frequency domain, and 1 is an index ranging from 0 to $N^{DL/UL}_{symb} - 1$ in the time domain.

Figure 4:
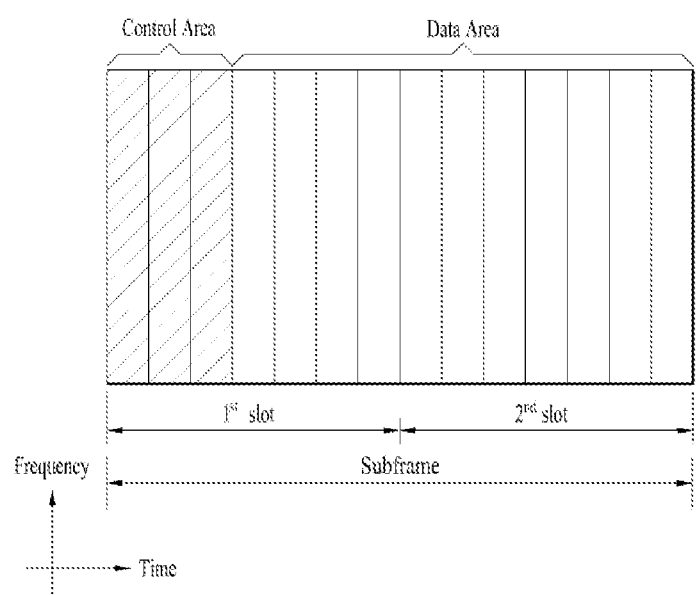
FIG. 4 shows a structure of a downlink subframe.

FIG. 4 illustrates a structure of a downlink subframe.

Referring to FIG. 4, a maximum of 3 (or 4) OFDM symbols positioned in the front part of a first slot of a subframe corresponds to the control area. The remaining OFDM symbols correspond to the data area to which the physical downlink shared chancel (PDSCH) is allocated. The basic resource unit of the data area is RB. Examples of a DL control channel used in LTE include a physical control format indicator channel (PCFICH), a physical downlink control channel (PDCCH), and a physical hybrid ARQ indicator channel (PHICH). The PCFICH is transmitted at the first OFDM symbol of a subframe and carries information about the number of OFDM symbols used for transmission of a control channel within the subframe. The PHICH is a response to UL transmission and carries a HARQ acknowledgment/negative-acknowledgment (ACK/NACK) signal. Control information transmitted on the PDCCH is referred to as downlink control information (DCI). The DCI includes a UL transmit power control command for any UE group or UL or DL scheduling information.

Figure 5:
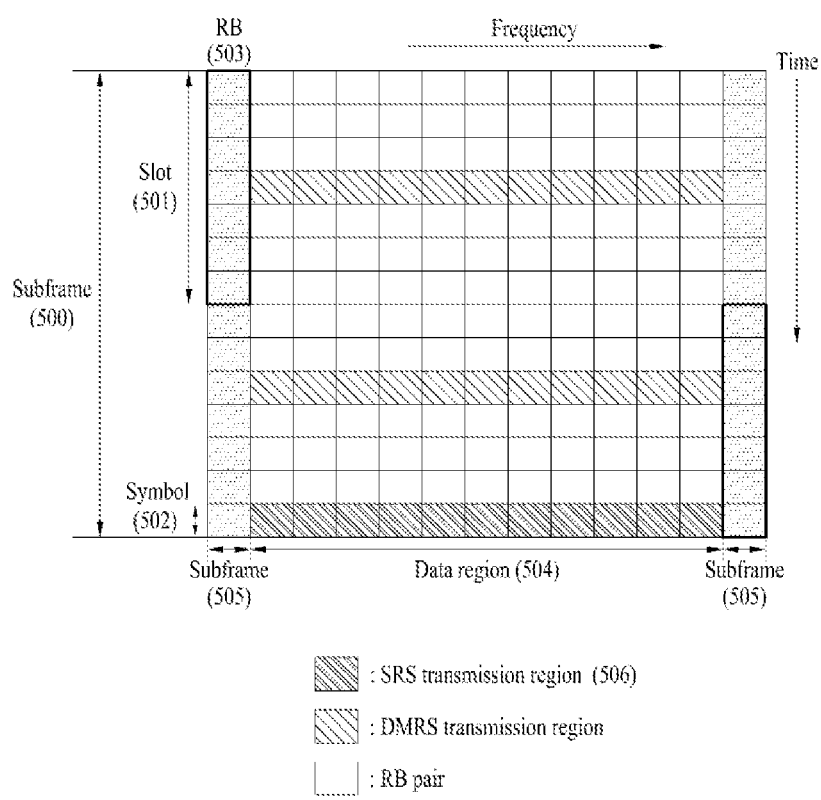
FIG. 5 illustrates a structure of an uplink subframe.

FIG. 5 illustrates the structure of an uplink subframe.

Referring to FIG. 5, a subframe 500 is composed of two 0.5 ms slots 501. Each slot is composed of a plurality of symbols 502, wherein one symbol corresponds to one SC-FDMA symbol. An RB 503 is a resource allocation unit corresponding to 12 subcarriers in the frequency domain and one slot in the time domain. The structure of a UL subframe for LTE is largely divided into a data region 504 and a control region 505. The data region refers to communication resources used to transmit data such as voice and packet to each UE and includes a physical uplink shared channel (PUSCH). The control region refers to communication resources used to transmit a UL control signal, for example, a DL channel quality report from each UE, a reception ACK/NACK for a DL signal, an UL scheduling request, etc., and includes a physical uplink control channel (PUCCH). A sounding reference signal (SRS) is transmitted on the last SC-FDMA symbol in a subframe on the time axis.

Figure 6:
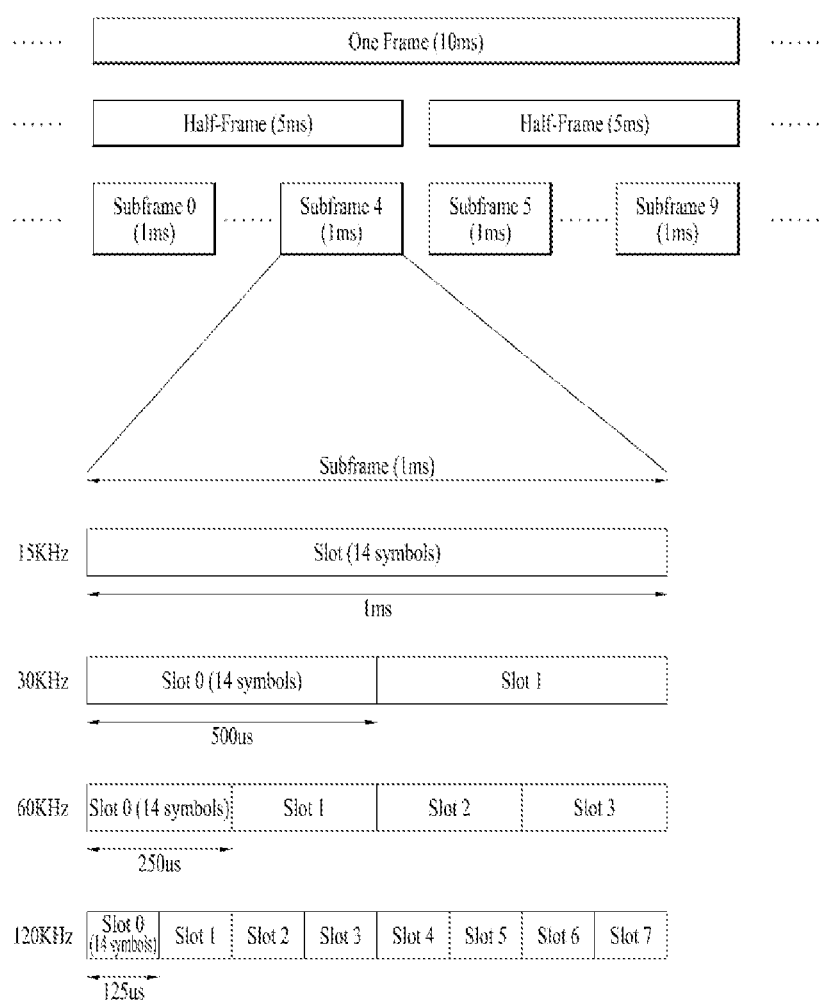
FIG. 6 illustrates a structure of a radio frame used in NR.

FIG. 6 illustrates a structure of a radio frame used in NR.

In NR, UL and DL transmissions are composed of frames. The radio frame is 10 ms long and may be defined as two half-frames (HFs), each 5 ms long. An HF may include 5 subframes (SFs), each 1 ms long. An SF may be split into one or more slots. The number of slots in the SF may be determined based on a subcarrier spacing (SCS). Each slot may include 12 or 14 OFDM(A) symbols depending on a cyclic prefix (CP). When a normal CP is used, each slot may include 14 symbols. When an extended CP is used, each slot may include 12 symbols. Here, a symbol may include an OFDM symbol (or CP-time resource duration) or an SC-FDMA symbol (or discrete Fourier transform-spread-OFDM (DFT-s-OFDM) symbol).

Table 4 below shows the number of symbols per slot, the number of slots per frame, and the number of slots per subframe, according to SCS configuration u when the normal CP is used.

TABLE 4

| SCS ($15*2^u$) | $N_{slot}^{symb}$ | $N_{frame,u}^{slot}$ | $N_{subframe,u}^{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N_{symb}^{slot}$: the number of symbols per slot;
$N_{slot}^{frame,u}$: the number of slots per frame;
$N_{slot}^{subframe,u}$: the number of slots per subframe.

Table 5 shows the number of symbols per slot, the number of slots per frame, and the number of slots per subframe according to SCS when the extended CP is used.

TABLE 5

| SCS ($15*2^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In an NR system, different OFDM(A) numerologies (e.g., SCSs and CP lengths) may be configured between a plurality of cells aggregated for one UE. Then, an (absolute time) duration of a time resource (e.g., a subframe, a slot, or a transmission time interval (TTI)) consisting of the same number of symbols (for convenience, referred to as a time unit (TU)) may be differently configured between the aggregated cells.

Figure 7:
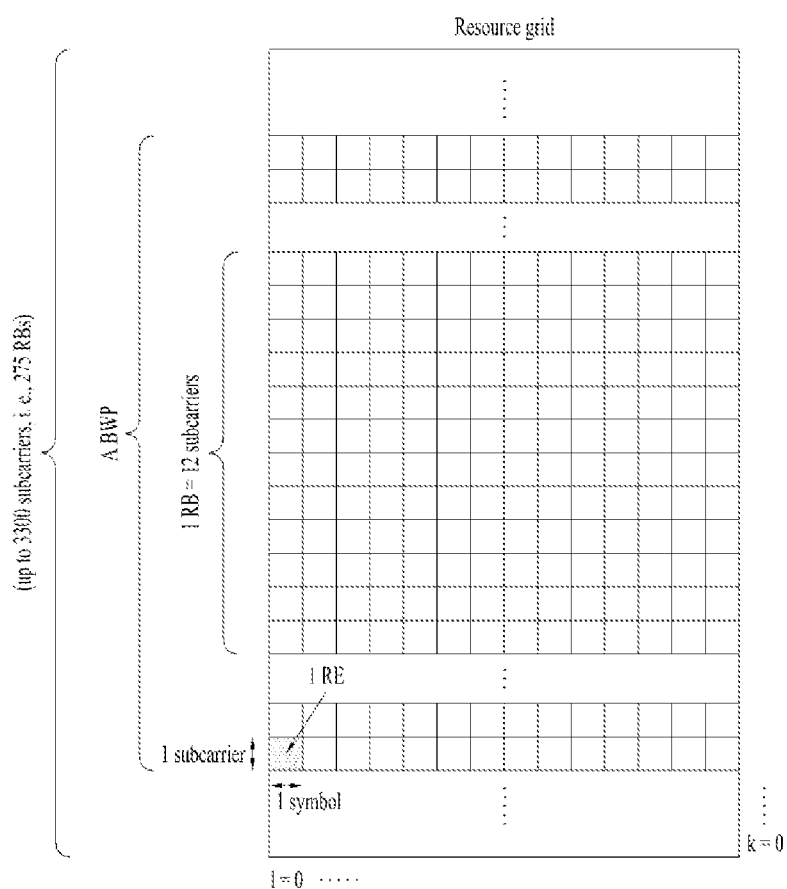
FIG. 7 illustrates a slot structure of an NR frame.

FIG. 7 illustrates a slot configuration of a NR frame.

A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 8:
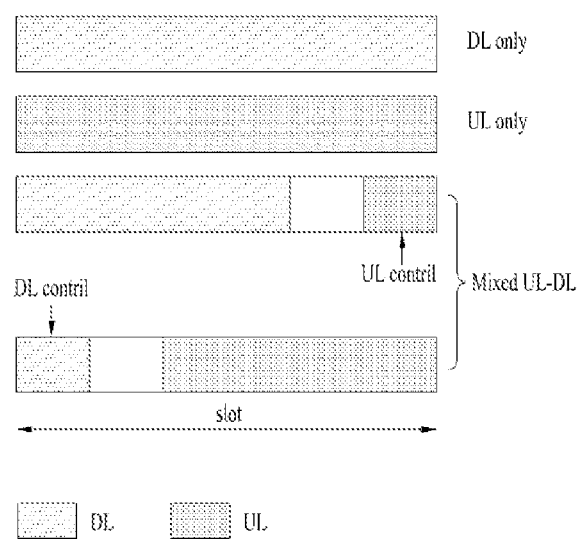
FIG. 8 illustrates a structure of a self-contained slot.

FIG. 8 illustrates a structure of a self-contained slot.

In the NR system, a frame has a self-contained structure in which a DL control channel, DL or UL data, a UL control channel, and the like may all be included in one slot. For example, the first N symbols (hereinafter referred to as a DL control region) in a slot may be used to transmit a DL control channel, and the last M symbols (hereinafter referred to as a UL control region) in the slot may be used to transmit a UL control channel. N and M are integers greater than 0. A resource region between the DL control region and the UL control region (hereinafter referred to as a data region) may be used for DL data transmission or UL data transmission. There may be a time gap for DL-to-UL or UL-to-DL switching between the control region and the data region. For example, the following configurations may be considered. Corresponding intervals are listed in temporal order.

1. DL only configuration
2. UL only configuration
3. Mixed UL-DL configuration
    DL region+Guard Period (GP)+UL control region;
    DL control region+GP+UL region,
    DL region: (i) DL data region or (ii) DL control region+DL data region;
    UL region: (i) UL data region or (ii) UL data region+UL control region.

A PDCCH may be transmitted in the DL control region, and a PDSCH may be transmitted in the DL data region. A PUCCH may be transmitted in the UL control region, and a PUSCH may be transmitted in the UL data region. The GP provides a time gap in the process of switching from the transmission mode to the reception mode or from the reception mode to the transmission mode. Some symbols at the time of switching from DL to UL within a subframe may be configured as the GP.

2. MTC (Machin Type Communication)

MTC is a type of data communication in which one or more machines are involved. It may be applied to M2M (Machine-to-Machine) or IoT (Internet-of-Things). Here, a machine represents an entity that does not require direct manipulation or intervention from human beings. For example, the machines include a smart meter equipped with a mobile communication module, a vending machine, and a portable terminal having an MTC function.

In 3GPP, MTC, which has been applied since release 10, may be implemented to meet the requirements for low cost & low complexity, enhanced coverage, and low power consumption. For example, 3GPP Release 12 added features for low-cost MTC devices, and UE category 0 was defined therefor. A UE category is an indicator of how much data a UE can process in a communication modem. UEs of UE category 0 may reduce baseband/RF complexity by using a reduced peak data rate, half-duplex operation with relaxed radio frequency (RF) requirements, and a single receive antenna. In 3GPP Release 12, eMTC (enhanced MTC) was introduced, and the cost and power consumption of MTC terminals were further lowered by operating only at 1.08

MHz (i.e., 6 RBs), which is the minimum frequency bandwidth supported by legacy LTE.

In the following description, the term MTC may be used interchangeably with terms such as eMTC, LTE-M1/M2, BL/CE (Bandwidth reduced low complexity/coverage enhanced), non-BL UE (in enhanced coverage), NR MTC, and enhanced BL/CE, or other equivalent terms. In addition, MTC terminals/devices include terminals/devices with MTC function (e.g., a smart meter, a bending machine, a portable terminal with an MTC function).

Figure 9:
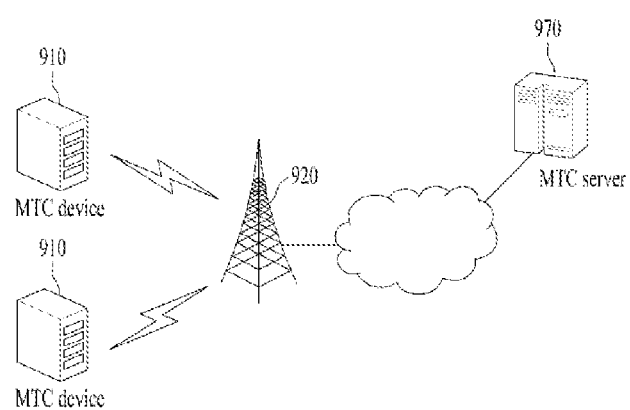
FIG. 9 is a diagram illustrating MTC communication.

FIG. 9 illustrates MTC communication.

Referring to FIG. 9, an MTC device 900 is a wireless device that provides the MTC communication function and may be fixed or mobile. For example, the MTC device 900 includes a smart meter equipped with a mobile communication module, a bending machine, and a portable terminal having an MTC function. A base station 920 may be connected to MTC devices 910 using a wireless access technology, and may be connected to an MTC server 970 over a wired network. The MTC server 970 is connected to the MTC devices 910 to provide MTC services to the MTC devices 910. Services provided through MTC are differentiated from existing communication services involving human intervention. Various categories of services such as tracking, metering, payment, medical services, and remote control may be provided through MTC. For example, services such as meter reading, water level measurement, use of surveillance cameras, and inventory reporting of vending machines may be provided through MTC. A characteristic of MTC communication is that the amount of transferred data is small, and uplink/downlink data transmission/reception occurs occasionally. Therefore, it is better in terms of efficiency to lower the unit cost of MTC devices and reduce battery power consumption in accordance with the low data rate. MTC devices generally have little mobility, and accordingly, the channel environment for MTC communication hardly changes.

Figure 10:
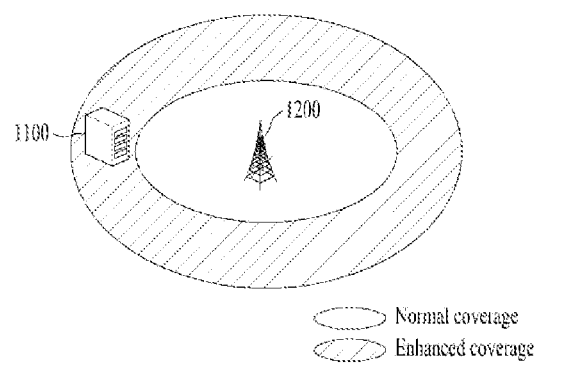
FIG. 10 illustrates cell coverage improvement in MTC.
Figure 10:
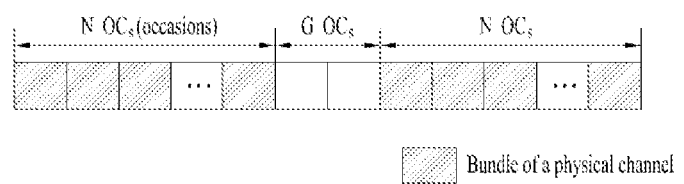

FIG. 10 illustrates cell coverage enhancement in MTC.

For an MTC device 1100, various cell coverage extension (or coverage enhancement) (CE) techniques are being discussed to extend the cell coverage of the base station. For example, for cell CE, the base station/terminal may transmit one physical channel/signal over a plurality of occasions (a bundle of physical channels). In the bundle period, the physical channel/signal may be repeatedly transmitted according to a predefined rule. A receiving device may increase the success rate of decoding of the physical channel/signal by decoding part or all of the physical channel/signal bundle. Here, the occasion may mean a resource (e.g., time/frequency) through which a physical channel/signal may be transmitted/received. Occasions for physical channels/signals may include subframes, slots or symbol sets in the time domain. Here, the symbol set may consist of one or more consecutive OFDM-based symbols. The OFDM-based symbols may include an OFDM(A) symbol and a DFT-s-OFDM(A) (=SC-FDM(A)) symbol. Occasions for a physical channel/signal may include a frequency band and an RB set in the frequency domain. For example, PBCH, PRACH, MPDCCH, PDSCH, PUCCH and PUSCH may be repeatedly transmitted.

Figure 11:
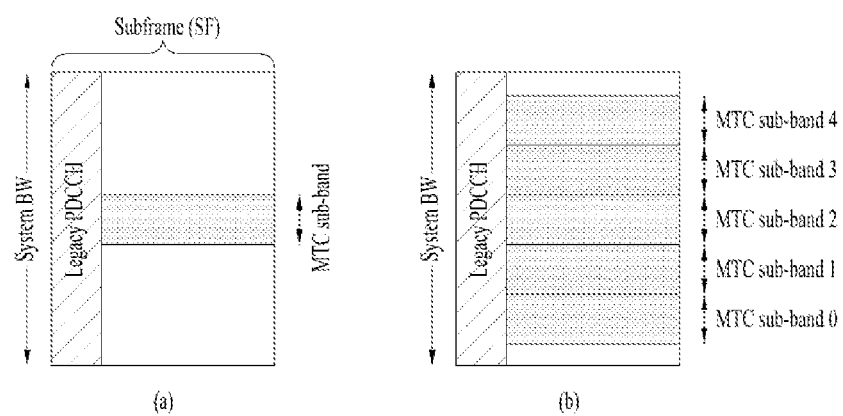
FIG. 11 illustrates a signal band for MTC.

FIG. 11 illustrates a signal band for MTC.

Referring to FIG. 11, as a method to lower the unit cost of MTC terminals, MTC may operate only in a specific band (or channel band) (hereinafter, MTC subband or narrow band (NB)) in the system bandwidth of the cell, regardless of the system bandwidth of the cell. For example, the uplink/downlink operation of an MTC terminal may be performed only in the 1.08 MHz frequency band. 1.08 MHz corresponds to six consecutive PRBs in the LTE system, and is defined to follow the same cell search and random access procedures as LTE terminals. FIG. 11(a) illustrates a case where an MTC subband is configured in the center of a cell (e.g., 6 PRBs in the center), and FIG. 11(b) illustrates a case where a plurality of MTC subbands is configured in a cell. A plurality of MTC subbands may be configured consecutively/non-consecutively in the frequency domain. Physical channels/signals for MTC may be transmitted and received in one MTC subband. In the NR system, the MTC subband may be defined in consideration of a frequency range and SCS. For example, in the NR system, the size of the MTC subband may be defined as X consecutive PRBs (i.e., a bandwidth of $0.18*X*(2^u)$ MHz) (see Table 4 for u). Here, X may be defined as 20 according to the size of a synchronization signal/physical broadcast channel (SS/PBCH) block. In the NR system, the MTC may operate in at least one bandwidth part (BWP). In this case, a plurality of MTC subbands may be configured in the BWP.

Figure 12:
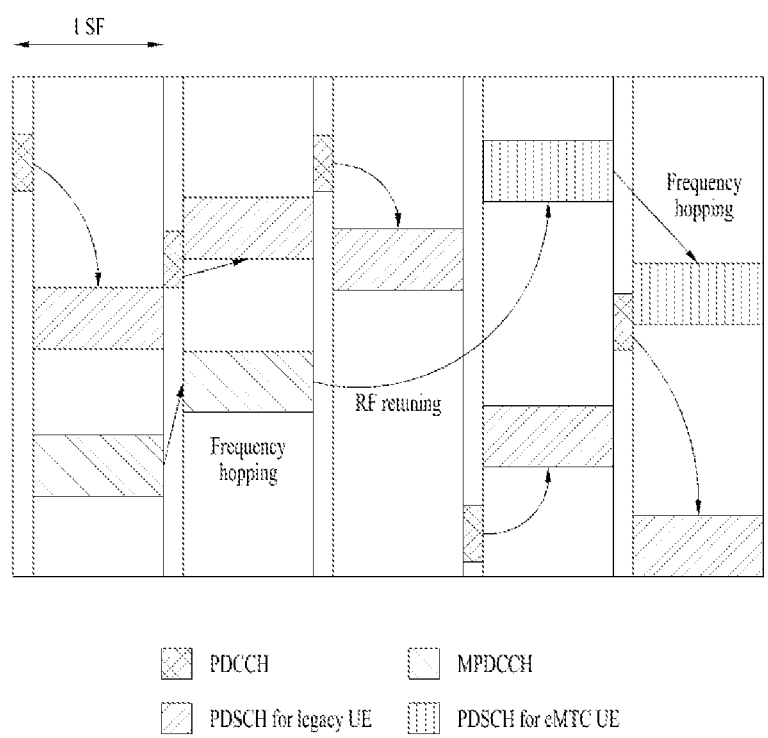
FIG. 12 illustrates scheduling in legacy LTE and MTC.

FIG. 12 illustrates scheduling in legacy LTE and MTC.

Referring to FIG. 12, in legacy LTE, a PDSCH is scheduled using a PDCCH. Specifically, the PDCCH may be transmitted on the first N OFDM symbols in a subframe (N=1 to 3), and the PDSCH scheduled by the PDCCH is transmitted in the same subframe. In MTC, the PDSCH is scheduled using an MPDCCH. Accordingly, the MTC terminal may monitor MPDCCH candidates in a search space within the subframe. Here, the monitoring includes blind decoding of MPDCCH candidates. The MPDCCH carries DCI, and the DCI includes UL or DL scheduling information. The MPDCCH is multiplexed with the PDSCH in a subframe through FDM. The MPDCCH is repeatedly transmitted in a maximum of 256 subframes, and the DCI transmitted on the MPDCCH includes information on the number of repetitions of the MPDCCH. In the case of DL scheduling, when the repetitive transmission of the MPDCCH ends in subframe #N, transmission of the PDSCH scheduled by the MPDCCH starts in subframe #N+2. The PDSCH may be repeatedly transmitted in a maximum of 2048 subframes. The MPDCCH and PDSCH may be transmitted in different MTC subbands. Accordingly, the MTC terminal may perform radio frequency (RF) retuning for PDSCH reception after MPDCCH reception. In the case of UL scheduling, when repetitive transmission of the MPDCCH ends in subframe #N, transmission of the PUSCH scheduled by the MPDCCH starts in subframe #N+4. When repetitive transmission is applied to a physical channel, frequency hopping between different MTC subbands is supported by RF retuning. For example, when the PDSCH is repeatedly transmitted in 32 subframes, the PDSCH may be transmitted in a first MTC subband in the first 16 subframes, and the PDSCH may be transmitted in a second MTC subband in the remaining 16 subframes. MTC operates in a half-duplex mode. HARQ retransmission in MTC is adaptive and asynchronous.

3. NB-IoT (Narrowband Internet of Things)

NB-IoT represents narrowband Internet of Things technology that supports a low-power wide area network through an existing wireless communication system (e.g., LTE, NR). In addition, NB-IoT may refer to a system for supporting low complexity and low power consumption through a narrowband. Since the NB-IoT system uses OFDM parameters such as subcarrier spacing (SCS) in the same way as the existing system, there is no need for separately allocation of additional bands for the NB-IoT system. For example, one PRB of the existing system band may be allocated for NB-IoT use. The NB-IoT terminal recognizes a single PRB as an individual carrier. Accordingly, the PRB and the carrier may be interpreted as having the same meaning in the description of NB-IoT.

The description of NB-IoT given below is mainly focused on cases applied to the existing LTE system. However, it should be noted that the following description is applicable even to a next-generation system (e.g., NR system, etc.). In addition, in the present disclosure, the contents related to NB-IoT are applicable even to MTC, which has similar technical purposes (e.g., low-power, low-cost, coverage enhancement, etc.). In addition, NB-IoT may be replaced with other equivalent terms such as NB-LTE, NB-IoT enhancement, enhanced NB-IoT, further enhanced NB-IoT, or NB-NR.

Figure 13:
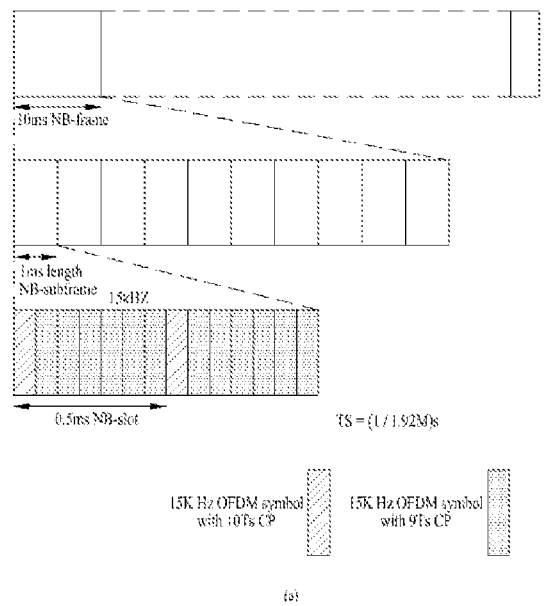
FIG. 13 illustrates an NB-IoT frame structure.
Figure 13:
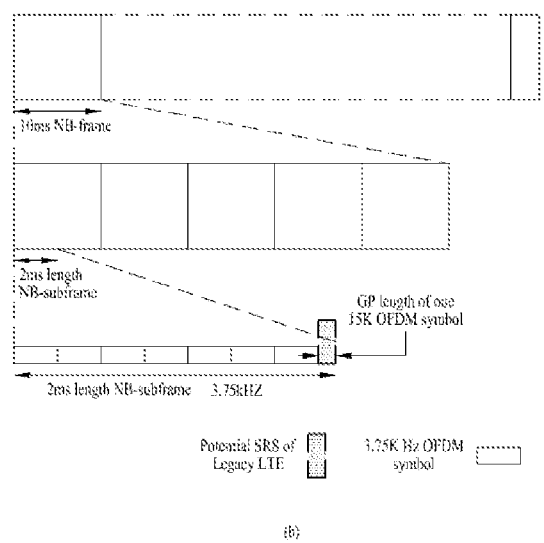

An NB-IoT frame structure may be configured differently according to the SCS. FIG. 13(a) illustrates a frame structure when the SCS is 15 kHz, and FIG. 13(b) illustrates a frame structure when the SCS is 3.75 kHz. The frame structure of FIG. 13(a) is used on downlink/uplink, whereas the frame structure of FIG. 13(b) may be used only on uplink.

Referring to FIG. 13(a), the NB-IoT frame structure for the SCS of 15 kHz may be configured to be the same as that of the legacy system (i.e., LTE system) (see FIG. 4). That is, a 10 ms NB-IoT frame may include 10 1 ms NB-IoT subframes, and a 1 ms NB-IoT subframe may include two 0.5 ms NB-IoT slots. Each 0.5 ms NB-IoT slot may include 7 symbols. The SCS of 15 kHz may be applied to both downlink and uplink. The symbols includes an OFDMA symbol on downlink and an SC-FDMA symbol on uplink. In the frame structure of FIG. 13(a), the system bandwidth is 1.08 MHz and is defined as 12 subcarriers. Since the SCS of 15 kHz is applied to both downlink and uplink, and orthogonality with the LTE system is guaranteed, coexistence with the LTE system may be smoothly implemented.

Referring to FIG. 13(b), when the SCS is 3.75 kHz, a 10 ms NB-IoT frame may include 5 2 ms NB-IoT subframes, and each 2 ms NB-IoT subframe may include 7 symbols and one guard period (GP) symbol. A 2 ms NB-IoT subframe may be expressed as an NB-IoT slot or an NB-IoT resource unit (RU). Here, the symbols may include an SC-FDMA symbol. In the frame structure of FIG. 13(b), the system bandwidth is 1.08 MHz and is defined as 48 subcarriers. The SCS of 3.75 kHz is applied only to uplink, and orthogonality with the LTE system may be disrupted, resulting in degradation of performance due to interference.

The figure illustrates an NB-IoT frame structure based on the LTE system frame structure. The illustrated NB-IoT frame structure may be extended and applied to a next-generation system (e.g., NR system). For example, in the frame structure of FIG. 13(a), the SCS may be replaced with the subframe interval of Table 4.

Figure 14:
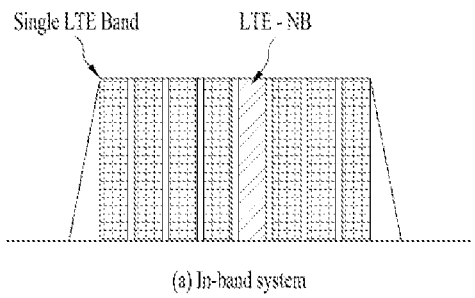
FIG. 14 illustrates three operation modes of NB-IoT.
Figure 14:
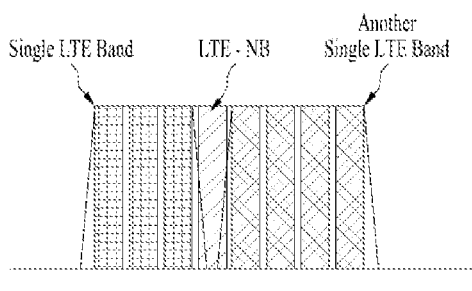
Figure 14:
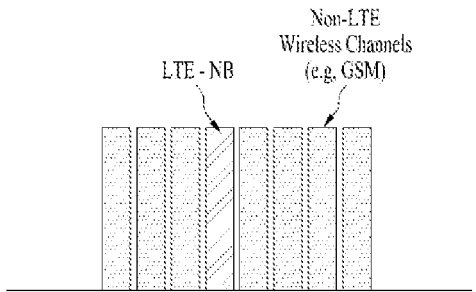

FIG. 14 illustrates three operation modes of NB-IoT.

Specifically, FIG. 14(a) illustrates an in-band system, FIG. 14(b) illustrates a guard-band system, and FIG. 14(c) illustrates a stand-alone system. Here, the in-band system may be represented by the in-band mode, the guard-band system may be represented by the guard-band mode, and the stand-alone system may be represented by the stand-alone mode. For simplicity, the NB-IoT operation modes will be described based on the LTE band, but the LTE band may be replaced with a band of another system (e.g., an NR system bandwidth).

The in-band mode refers to an operation mode for performing NB-IoT in the (legacy) LTE band. In the in-band mode, some resource blocks of the LTE system carrier may be allocated for NB-IoT. For example, in the in-band mode, one specific RB (i.e., PRB) in the LTE band may be allocated for NB-IoT. The in-band mode may be operated in a structure in which NB-IoT coexists in the LTE band. The guard-band mode refers to an operation mode in which NB-IoT is performed in a space reserved for the guard-band of the (legacy) LTE band. Accordingly, in the guard-band mode, a guard-band of an LTE carrier that is not used as a resource block in the LTE system may be allocated for NB-IoT. The (legacy) LTE band may have a guard-band of at least 100 kHz at the end of each LTE band. The stand-alone mode refers to an operation mode in which NB-IoT is performed in a frequency band configured independently of the (legacy) LTE band. For example, in the stand-alone mode, a frequency band (e.g., a GSM carrier reassigned in the future) used on the GSM EDGE Radio Access Network (GERAN) may be allocated for NB-IoT.

The NB-IoT terminal searches for an anchor carrier in units of 100 kHz for initial synchronization, and the center frequency of the anchor carrier in the in-band and guard-band should be within ±7.5 kHz from the 100 kHz channel raster. In addition, among the LTE PRBs, 6 center PRBs are not allocated to NB-IoT. Therefore, the anchor carrier may be positioned only in a specific PRB.

Figure 15:
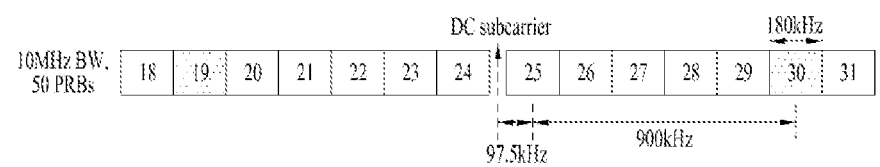
FIG. 15 illustrates deployment of an in-band anchor carrier in an LTE bandwidth of 10 MHz.

FIG. 15 illustrates deployment of an in-band anchor carrier in an LTE bandwidth of 10 MHz.

Referring to FIG. 15, a direct current (DC) subcarrier is positioned in a channel raster. Since the center frequency interval between adjacent PRBs is 180 kHz, the center frequency of PRB indexes 4, 9, 14, 19, 30, 35, 40, 45 is positioned at ±2.5 kH from the channel raster. Similarly, the center frequency of a PRB that is appropriate as an anchor carrier in the LTE bandwidth of 20 MHz is positioned at ±2.5 kHz from the channel raster, and the center frequency of the PRB that is appropriate as an anchor carrier in the LTE bandwidths of 3 MHz, 5 MHz and 15 MHz is positioned at ±7.5 kHz from the channel raster.

In the guard-band mode, the center frequency of the PRB immediately adjacent to the edge PRB of LTE is positioned at ±2.5 kHz from the channel raster in bandwidths of 10 MHz and 20 MHz. In the case of bandwidths of 3 MHz, 5 MHz, and 15 MHz, the center frequency of the anchor carrier may be positioned at ±7.5 kHz from the channel raster as a guard frequency band corresponding to three subcarriers from the edge PRB is used.

In the stand-alone mode, anchor carriers are aligned with the 100 kHz channel raster, and all GSM carriers including the DC carrier may be utilized as NB-IoT anchor carriers.

NB-IoT supports multi-carrier, and a combination of in-band+in-band, in-band+guard-band, guard band+guard-band, or stand-alone+stand-alone may be used.

The NB-IoT downlink uses an OFDMA scheme having the SCS of 15 kHz. This provides orthogonality between subcarriers, thereby facilitating coexistence with the LTE system.

Physical channels such as a narrowband physical broadcast channel (NPBCH), a narrowband physical downlink shared channel (NPDSCH), and a narrowband physical downlink control channel (NPDCCH) are provided for NB-IoT downlink, and physical signals such as a narrowband primary synchronization signal (NPSS), a narrowband primary synchronization signal (NSSS) and a narrowband reference signal (NRS) are provided.

The NPBCH delivers master information block-narrowband (MIB-NB), which is the minimum system information required for access to the system by an NB-IoT terminal, to the terminal. The NPBCH signal may be repeatedly transmitted 8 times to enhance the coverage. A transport block size (TBS) of the MIB-NB is 34 bits, and is updated every 640 ms TTI period. The MIB-NB includes information such as an operation mode, a system frame number (SFN), a Hyper-SFN, a cell-specific reference signal (CRS) port number, and a channel raster offset.

The NPSS is composed of a Zadoff-Chu (ZC) sequence with a sequence length equal to 11 and a root index equal to 5. The NPSS may be generated according to the following equation.

$$d_l(n) = S(l) \cdot e^{-j\frac{\pi ln(n+1)}{11}}, n = 0, 1, \ldots, 10 \quad \text{[Equation 1]}$$

Here, S(l) for the OFDM symbol index l may be defined as shown in Table 6.

TABLE 6

| Cyclic prefix length | S(3), . . . , S(13) |          |   |   |    |    |   |   |   |    |   |
|---|---|---|---|---|---|---|---|---|---|---|---|
| Normal | 1 | 1 | 1 | 1 | −1 | −1 | 1 | 1 | 1 | −1 | 1 |

The NSSS is composed of a combination of a ZC sequence with a sequence length of 131 and a binary scrambling sequence such as a Hadamard sequence. The NSSS indicates a PCID to NB-IoT terminals in the cell through a combination of the sequences.

The NSSS may be generated according to the following equation.

$$d(n) = b_q(m)e^{-j2\pi\theta_f n}e^{-j\frac{\pi m'(n'+1)}{131}} \quad \text{[Equation 2]}$$

Here, the variables employed in Equation 2 may be defined as follows.

n=0,1, . . . ,131 n'=n mod 131 m=n mod 128

$u = N_{ID}^{Ncell} \mod 126 + 3$ [Equation 3]

$$q = \left\lfloor \frac{N_{ID}^{Ncell}}{126} \right\rfloor$$

Here, the binary sequence bq(m) is defined as shown in Table 7, where b0(m) to b3(m) correspond to columns 1, 32, 64, and 128 of the 128th-order Hadamard matrix, respectively. The cyclic shift θf for the frame number θf may be defined as in Equation 4.

TABLE 7

| q | $b_q$ (0), . . . , $b_q$ (127) |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 −1 1 1 −1 1 −1 1 −1 1 −1 −1 1 −1 1 1 −1 −1 1 1 −1 1 −1 1 −1 1 1 −1 1 −1 −1 1 −1 −1 1 −1 1 −1 1 1 −1 1 −1 1 −1 −1 1 1 −1 1 −1 −1 1 1 1 1 −1 −1 1 1 −1 1 −1 −1 1 −1 −1 1 1 −1 −1 1 1 1 −1 1 1 −1 −1 1 −1 1 1 −1 1 −1 1 −1 −1 1 1 −1 1 −1 1 −1 1 1 −1 1 −1 −1 1 1 −1 −1 1 −1 1 1 −1 −1 1 1 1 −1 1 −1 1 1 −1 1 −1 1 −1 1 1 −1] |
| 2 | [1 −1 −1 1 −1 1 1 −1 −1 1 1 −1 −1 1 1 −1 1 −1 −1 1 −1 1 1 −1 −1 1 1 −1 −1 1 1 −1 −1 1 1 −1 1 −1 −1 1 1 −1 −1 1 1 −1 −1 1 1 −1 −1 1 −1 1 1 −1 −1 1 1 −1 −1 1 1 −1 −1 1 1 −1 1 −1 −1 1 1 −1 −1 1 1 −1 −1 1 1 −1 −1 1 −1 1 1 −1 −1 1 1 −1 −1 1 1 −1 −1 1 1 −1 1 −1 −1 1 1 −1 −1 1 1 −1 −1 1 1 −1 −1 1 −1 1 1 −1 −1 1 1 −1 −1 1 1 −1 1 1] |
| 3 | [1 −1 −1 1 −1 1 1 −1 1 1 −1 1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 −1 1 1 −1 1 −1 −1 1 −1 1 1 −1] |

$$\theta_f = \frac{33}{132}(n_f/2) \mod 4 \quad \text{[Equation 4]}$$

Here, $n_f$ denotes a radio frame number. mod denotes the modulo function.

Downlink physical channels/signals includes NPSS, NSSS, NPBCH, NRS, NPDCCH and NPDSCH.

Figure 16:
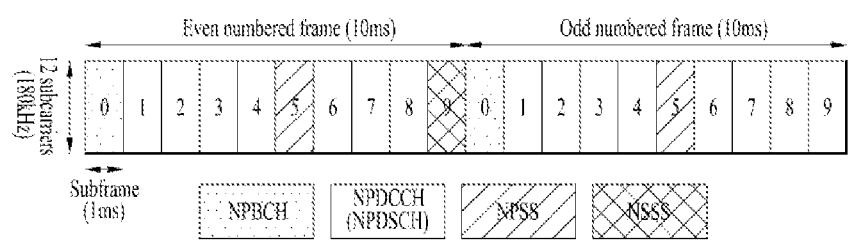
FIG. 16 illustrates positions where an NB-IoT downlink physical channel/signal is transmitted in an FDD LTE system.

FIG. 16 illustrates transmission of an NB-IoT downlink physical channel/signal in an FDD LTE system. The downlink physical channel/signal is transmitted through one PRB and supports the SCS of 15 kHz/multi-tone transmission.

Referring to FIG. 16, the NPSS is transmitted in the sixth subframe in every frame, and the NSSS is transmitted in the last (e.g., tenth) subframe in every even frame. The UE may acquire frequency, symbol, and frame synchronization using a synchronization signal (NPSS, NSSS) and search for 504 physical cell IDs (PCIDs) (i.e., base station IDs). The NPBCH is transmitted in the first subframe of every frame and carries NB-MIB. The NRS is provided as a reference signal for DL physical channel demodulation and is generated in the same manner as in LTE. However, the NB-PCID (or NCell ID or NB-IoT base station ID) is used as an initialization value for generating an NRS sequence. The NRS is transmitted through one or two antenna ports. The NPDCCH and NPDSCH may be transmitted in the remaining subframes except for the NPSS/NSSS/NPBCH. The NPDCCH and NPDSCH are not allowed to be transmitted together in the same subframe. The NPDCCH carries DCI. The DCI supports three types of DCI formats. DCI format N0 includes narrowband physical uplink shared channel (NPUSCH) scheduling information, and DCI formats N1 and N2 include NPDSCH scheduling information. The NPDCCH may be transmitted up to 2048 times to enhance the coverage. The NPDSCH is used to transmit data (e.g., TB) of a transport channel such as a downlink-shared channel (DL-SCH) and a paging channel (PCH). The maximum TBS is 680 bits, and transmission may be repeated a maximum of 2048 times to enhance the coverage.

The uplink physical channels include a narrowband physical random access channel (NPRACH) and an NPUSCH, and support single-tone transmission and multi-tone transmission. The single-tone transmission is supported for the SCS of 3.5 kHz and 15 kHz, and the multi-tone transmission is supported only for the SCS of 15 kHz.

Figure 17:
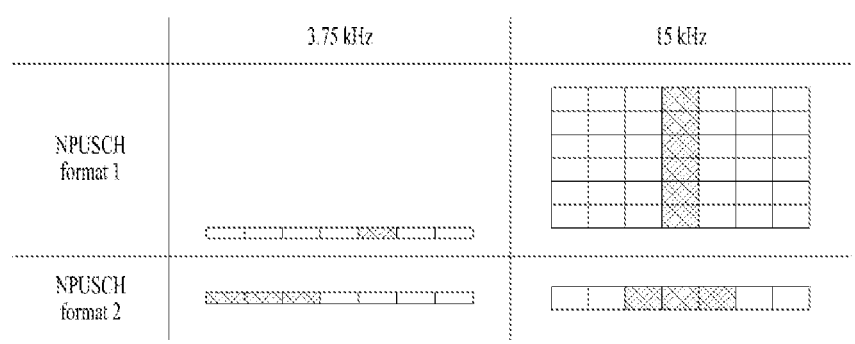
FIG. 17 illustrates NPUSCH formats.

FIG. 17 illustrates NPUSCH formats.

The NPUSCH supports two formats. NPUSCH format 1 is used for UL-SCH transmission, and the maximum TBS is 1000 bits. NPUSCH format 2 is used for transmission of uplink control information such as HARQ ACK signaling. NPUSCH format 1 supports single-/multi-tone transmission, and NPUSCH format 2 supports only single-tone transmission. For single-tone transmission, pi/2-BPSK (Binary Phase Shift Keying) and pi/4-QPSK (Quadrature Phase Shift Keying) are used to reduce the Peat-to-Average power ratio (PAPR). For the NPUSCH, the number of slots occupied by one resource unit (RU) may vary according to resource allocation. The RU represents the smallest RU to which a TB is mapped, and is composed of $N^{UL}_{symb} * N^{UL}_{slots}$ consecutive SC-FDMA symbols in the time domain and $N^{RU}_{sc}$ consecutive subcarriers in the frequency domain. Here, $N^{UL}_{symb}$ denotes the number of SC-FDMA symbols in a slot, $N^{UL}_{slots}$ denotes the number of slots, and $N^{RU}_{sc}$ denotes the number of subcarriers constituting an RU.

Table 8 shows example configurations of an RU according to the NPUSCH formats and the subcarrier spacing. In the case of TDD, the supported NPUSCH format and SCS differ among the uplink-downlink configurations. For the uplink-downlink configurations, reference may be made to Table 2.

TABLE 8

| NPUSCH format | Subcarrier spacing | Supported uplink-downlink configurations | $N^{RU}_{sc}$ | $N^{UL}_{slots}$ | $N^{UL}_{symb}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

Scheduling information for transmission of UL-SCH data (e.g., UL-SCH TB) is included in DCI format NO, and DCI format NO is transmitted on the NPDCCH. DCI format NO includes information on the start time of the NPUSCH, the number of repetitions, the number of RUs used for TB transmission, the number of subcarriers, resource positions in the frequency domain, MCS, and the like.

Referring to FIG. 17, a DMRS is transmitted on one or three SC-FDMA symbols per slot according to the NPUSCH format. The DMRS is multiplexed with data (e.g., TB, UCI), and is transmitted only in an RU including data transmission.

Figure 18:
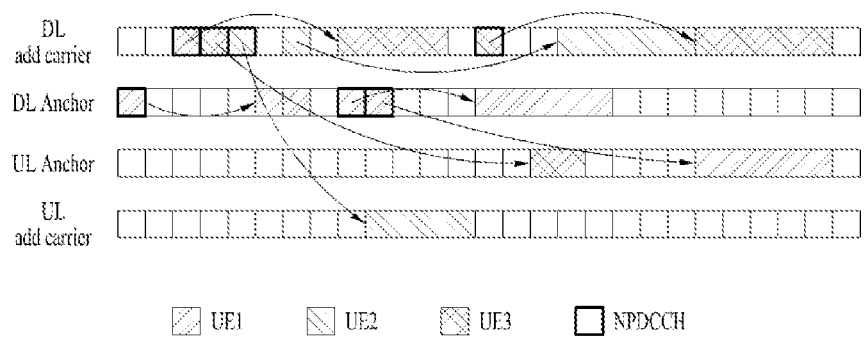
FIG. 18 illustrates an operation when a multi-carrier is configured in NB-IoT.

FIG. 18 illustrates an operation when a multi-carrier is configured in FDD NB-IoT.

In the FDD NB-IoT, a DL/UL anchor-carrier is basically configured, and a DL (and UL) non-anchor carrier may be additionally configured. Information on the non-anchor carrier may be included in RRCConnectionReconfiguration. When the DL non-anchor carrier is configured, the UE receives data only in the DL non-anchor carrier. On the other hand, synchronization signals (NPSS, NSSS), broadcast signals (MIB, SIB), and paging signals are provided only in the anchor-carrier. When the DL non-anchor carrier is configured, the UE listens only to the DL non-anchor carrier while staying in the RRC_CONNECTED mode. Similarly, when the UL non-anchor carrier is configured, the UE transmits data only on the UL non-anchor carrier, and simultaneous transmission on the UL non-anchor carrier and the UL anchor-carrier is not allowed. When transitioning to the RRC_IDLE mode, the UE returns to the anchor-carrier.

In FIG. 18, UE1 is configured with only an anchor-carrier, UE2 is configured with an additional DL/UL non-anchor carrier, and UE3 is configured with an additional DL non-anchor carrier. Accordingly, carriers on which data is transmitted/received by each UE are configured as follows.

UE1: Data reception (DL anchor-carrier), data transmission (UL anchor-carrier)

UE2: Data reception (DL non-anchor-carrier), data transmission (UL non-anchor-carrier)

UE3: Data reception (DL non-anchor-carrier), data transmission (UL anchor-carrier)

An NB-IoT UE is not allowed to perform transmission and reception simultaneously, and transmission/reception operations thereof are each limited to one band. Therefore, even when a multi-carrier is configured, the UE requires only one transmission/reception chain of the 180 kHz band.

4. Network Access and Communication Procedure

A UE may perform a network access procedure to perform the procedures and/or methods described/suggested above. For example, while accessing a network (e.g., a base station), the UE may receive system information and configuration information required to perform the procedures and/or methods described/proposed above, and store the same in a memory. The configuration information required for the present disclosure may be received through higher layer (e.g., RRC layer; medium access control (MAC) layer, etc.) signaling.

Figure 19:
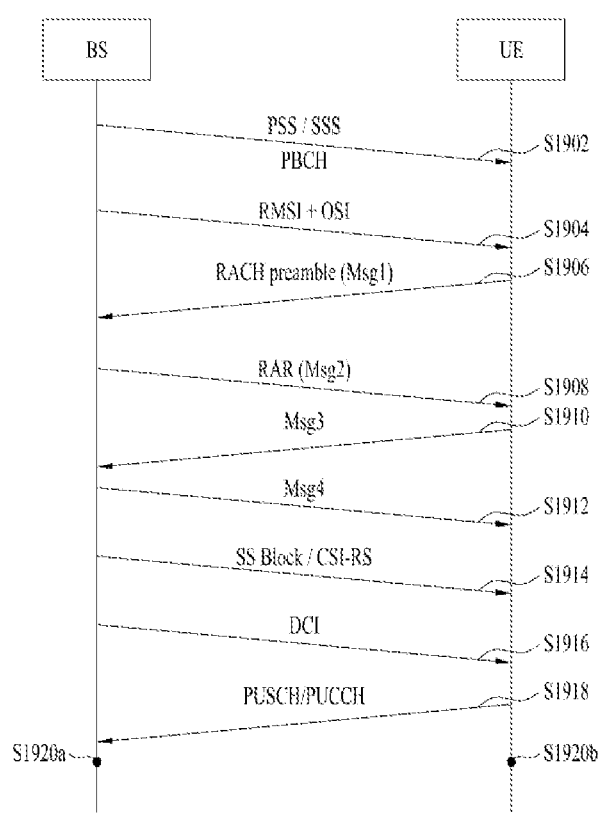
FIG. 19 illustrates an NB-IoT network access procedure.

FIG. 19 illustrates an initial network access and a subsequent communication procedure. In NR, a physical channel and a reference signal may be transmitted using beam-forming. When beam-forming-based signal transmission is supported, a beam management procedure may be involved in order to align beams between the base station and the UE. In addition, the signal proposed in the present disclosure may be transmitted/received using beam-forming. In the radio resource control (RRC) IDLE mode, beam alignment may be performed based on SSB. On the other hand, in the RRC CONNECTED mode, beam alignment may be performed based on CSI-RS (on DL) and SRS (on UL). When beam-forming-based signal transmission is not supported, the beam related operation may be skipped in the following description.

Referring to FIG. 19, a base station (e.g., BS) may periodically transmit an SSB (S1902). Here, the SSB includes PSS/SSS/PBCH. The SSB may be transmitted using beam sweeping. The PBCH includes a master information block (MIB), and the MIB may include scheduling information about remaining minimum system information (RMSI). Thereafter, the base station may transmit the RMSI and other system information (OSI) (S1904). The RMSI may include information (e.g., PRACH configuration information) necessary for the UE to initially access the base station. After performing SSB detection, the UE identifies the best SSB. Thereafter, the UE may transmit a RACH preamble (Message 1 (Msg1)) to the base station using the PRACH resource linked/corresponding to the index (i.e., the beam) of the best SSB (S1906). The beam direction of the RACH preamble is associated with the PRACH resource.

The association between the PRACH resource (and/or the RACH preamble) and the SSB (index) may be set through system information (e.g., RMSI). Thereafter, as part of the RACH procedure, the base station may transmit a random access response (RAR) (Msg2) in response to the RACH preamble (S1908), and the UE may transmit Msg3 (e.g., RRC connection request) using a UL grant in the RAR (S1910). The base station may transmit a contention resolution message (Msg4) (S2120). Msg4 may include RRC connection setup.

When an RRC connection is set up between the base station and the UE through the RACH procedure, beam alignment may be subsequently performed based on the SSB/CSI-RS (in DL) and the SRS (in UL). For example, the UE may receive the SSB/CSI-RS (S1914). The SSB/CSI-RS may be used for the UE to generate a beam/CSI report. The base station may make a request for a beam/CSI report to the UE through DCI (S1916). In this case, the UE may generate a beam/CSI report based on the SSB/CSI-RS, and transmit the generated the beam/CSI report to the base station on the PUSCH/PUCCH (S1918). The beam/CSI report may include a beam measurement result and information on a preferred beam. The base station and the UE may switch beams based on the beam/CSI report (S1920a, S1920b).

Thereafter, the UE and the base station may perform the procedures and/or methods described/proposed above. For example, the UE and the base station may process information in the memory according to the proposal of the present disclosure based on the configuration information obtained in the network access procedure (e.g., the system information acquisition procedure, the RRC connection procedure through RACH, etc.) and transmit a radio signal, or may process a received radio signal and store the same in the memory. Here, the radio signal may include at least one of a PDCCH, a PDSCH, or a reference signal (RS) in the case of downlink, and include at least one of a PUCCH, a PUSCH, or an SRS in the case of uplink.

The description above may be basically applied to MTC and NB-IoT in common. Parts that may differ between MTC and NB-IoT will be further described below.

4.1 MTC Network Access Procedure

An MTC network access procedure will be additionally described based on LTE. The following description may be extended and applied to NR. In LTE, an MIB includes 10 reserved bits. In MTC, 5 most significant bits (MSBs) among the 10 reserved bits in the MIB are used to indicate scheduling information about a system information block for bandwidth reduced device (SIB1-BR). Five MSBs are used to indicate the number of repetitions of SIB1-BR and a transport block size (TBS). The SIB1-BR is transmitted on the PDSCH. The SIB1-BR may be unchanged in 512 radio frames (5120 ms) to allow multiple subframes to be combined. The information carried in SIB1-BR is similar to that of SIB1 in the LTE system.

The MTC RACH procedure is basically the same as the LTE RACH procedure, except the following differences: the MTC RACH procedure is performed based on the coverage enhancement (CE) level. For example, in order to enhance the PRACH coverage, whether PRACH is repeatedly transmitted/the number of repetitions thereof may vary among the CE levels.

Table 9 shows example CE modes/levels supported by MTC. MTC supports two modes (CE mode A and CE mode B) and four levels (levels 1 to 4) for CE.

TABLE 9

| Mode | Level | Description |
| --- | --- | --- |
| Mode A | Level 1 | No repetition |
|  | Level 2 | Small Number of Repetition |
| Mode B | Level 3 | Medium Number of Repetition |
|  | Level 4 | Large Number of Repetition |

CE mode A is a mode for small coverage enhancement in which complete mobility and CSI feedback are supported, and there may be no repetition or the number of repetitions may be set to be small. CE mode B is a mode for a UE with extremely poor coverage conditions supporting CSI feedback and limited mobility, and the number of repetitions may be set to be large.

The base station broadcasts system information including a plurality (e.g., three) of reference signal received power (RSRP) thresholds, and the UE may determine the CE level by comparing the RSRP thresholds and the RSRP measurement value. The following information may be independently configured through system information for each CE level.

PRACH resource information: PRACH opportunity period/offset, and PRACH frequency resource Preamble group: A preamble set assigned for each CE level Number of repetitions per preamble attempt, the maximum number of preamble attempts RAR window time: Length of a time period in which RAR reception is expected (e.g., the number of subframes)

Conflict resolution window time: Length of a time period in which a conflict resolution message is expected to be received.

After the UE selects a PRACH resource corresponding to the CE level thereof, the UE may perform PRACH transmission based on the selected PRACH resource. The PRACH waveform used in MTC is the same as the PRACH waveform used in LTE (e.g., OFDM and Zadoff-Chu sequence). Signals/messages transmitted after the PRACH may also be repeatedly transmitted, and the number of repetitions thereof may be independently set according to the CE mode/level.

4.2 NB-IoT Network Access Procedure

Figure 21:
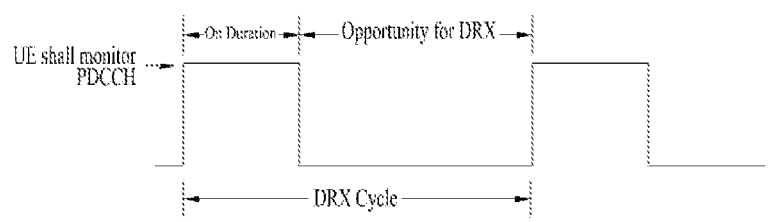
FIG. 21 illustrates a DRX cycle for discontinuous reception of a PDCCH.

An NB-IoT network access procedure will be additionally described based on LTE. The following description may be extended and applied to NR. In FIG. 21, the PSS, SSS, and PBCH of S2102 are replaced by an NPSS, NSSS and NPBCH in NB-IoT, respectively. For details of the NPSS, NSSS and NPBCH, reference may be made to FIG. 16.

The NB-IoT RACH procedure is basically the same as the LTE RACH procedure, except the following differences. First, the RACH preamble format is different. In LTE, the preamble is based on a code/sequence (e.g., Zadoff-Chu sequence). In NB-IoT, on the other hand, the preamble is a subcarrier. Second, the NB-IoT RACH procedure is performed based on the CE level. Therefore, PRACH resources are allocated differently for each CE level. Third, no SR resource is configured in NB-IoT, and therefore a UL resource allocation request is made in NB-IoT using the RACH procedure.

Figure 20:
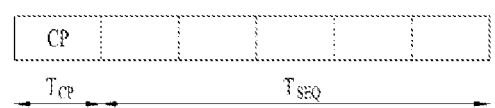
FIG. 20 illustrates preamble transmission on an NB-IoT RACH.
Figure 20:
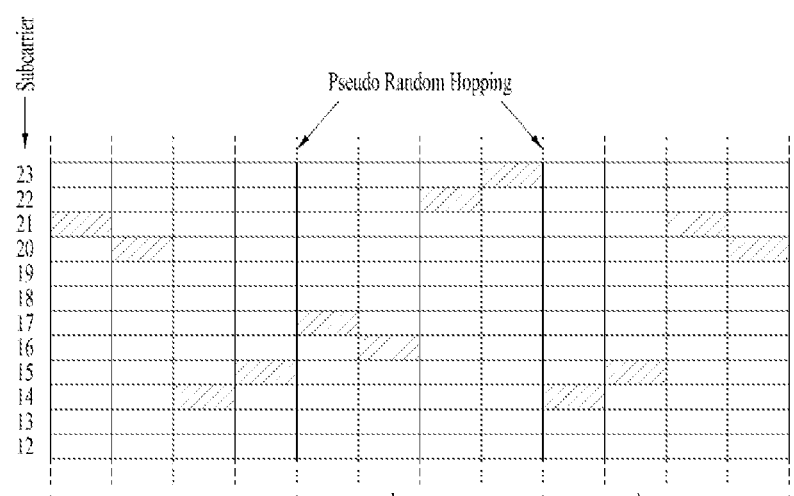

FIG. 20 illustrates preamble transmission on an NB-IoT RACH.

Referring to FIG. 20, the NPRACH preamble is composed of four symbol groups, and each of the symbol groups may be composed of a CP and a plurality of SC-FDMA symbols (e.g., 5 SC-FDMA symbols). In NR, the SC-FDMA symbol may be replaced with an OFDM symbol or a DFT-s-OFDM symbol. The NPRACH supports only single-tone transmission with a subcarrier spacing of 3.75 kHz, and provides CPs having a length of 66.7 μs and 266.67 μs to support different cell radii. Each symbol group performs frequency hopping in a hopping pattern as follows. The subcarrier for transmitting the first symbol group is determined in a pseudo-random manner. The second symbol group performs 1 subcarrier hopping, the third symbol group performs 6 subcarrier hopping, and the fourth symbol group performs 1 subcarrier hopping. In repetitive transmission, the frequency hopping procedure is repeatedly applied, and the NPRACH preamble may be repeatedly transmitted {1, 2, 4, 8, 16, 32, 64, 128} times to enhance the coverage. NPRACH resources may be configured for each CE level. The UE may select an NPRACH resource based on the CE level determined according to a DL measurement result (e.g., RSRP), and transmit a RACH preamble using the selected NPRACH resource. The NPRACH may be transmitted on an anchor carrier, or may be transmitted on a non-anchor carrier in which NPRACH resources are configured.

5. DRX (Discontinuous Reception)

A UE may perform the DRX operation while executing the procedures and/or methods described/proposed above. A UE for which DRX is configured may reduce power consumption by discontinuously receiving a DL signal. DRX may be performed in an RRC_IDLE mode, an RRC_INACTIVE mode, or an RRC_CONNECTED mode.

5.1 RRC_CONNECTED DRX

In the RRC_CONNECTED mode, DRX is used for discontinuous reception of the PDCCH. For simplicity, DRX performed in the RRC_CONNECTED mode is referred to as RRC_CONNECTED DRX.

FIG. 21 illustrates a DRX cycle for discontinuous reception of a PDCCH.

Referring to FIG. 21, a DRX cycle consists of On Duration and Opportunity for DRX. The DRX cycle defines a time interval during which On Duration is periodically repeated. On Duration represents a time period during which the UE performs monitoring to receive the PDCCH (or MPDCCH, NPDCCH). When DRX is configured, the UE performs PDCCH monitoring during the On Duration. When there is a PDCCH successfully detected in the PDCCH monitoring, the UE operates an inactivity timer and maintains an awake state. On the other hand, when there is no PDCCH successfully detected in the PDCCH monitoring, the UE enters a sleep mode after the On Duration ends. Accordingly, when DRX is configured, PDCCH monitoring/reception may be discontinuously performed in the time domain in executing the procedures and/or methods described/proposed above. For example, when DRX is configured, PDCCH monitoring according to the present disclosure may be performed discontinuously according to the DRX configuration in the activated cell(s). Specifically, PDCCH monitoring may be performed when a PDCCH occasion (e.g., a time interval set to monitor the PDCCH (e.g., one or more consecutive OFDM symbols)) corresponds to an On Duration. When the occasion corresponds to an opportunity for DRX, PDCCH monitoring may be skipped. On the other hand, when DRX is not configured, PDCCH monitoring/reception may be continuously performed in the time domain in executing the procedures and/or methods described/proposed above. For example, when DRX is not configured, PDCCH reception occasions may be continuously configured in the present disclosure.

Regardless of whether or not DRX is configured, PDCCH monitoring may be restricted in a time period set as a measurement gap.

Figure 23:
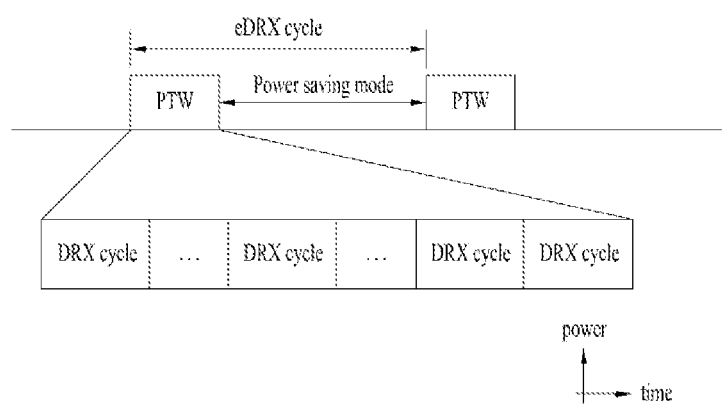
FIG. 23 illustrates an extended DRX (eDRX) cycle.

Table 10 shows a UE procedure related to DRX (RRC_CONNECTED mode). Referring to Table 10, DRX configuration information is received through higher layer (e.g., RRC) signaling, and DRX ON/OFF is controlled by a DRX command of the MAC layer. When DRX is configured, the UE may discontinuously perform PDCCH monitoring in executing the procedures and/or methods described/proposed in the present disclosure, as illustrated in FIG. 23.

TABLE 10

| | Type of signals | UE procedure |
|---|---|---|
| 1$^{st}$ step | RRC signalling (MAC-Cell GroupConfig | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

Here, MAC-CellGroupConfig includes configuration information required to set a medium access control (MAC) parameter for a cell group. MAC-CellGroupConfig may also include configuration information about DRX. For example, MAC-CellGroupConfig defines DRX and may include the following information.

Value of drx-OnDurationTimer: Defines the length of the starting section of the DRX cycle.

Value of drx-InactivityTimer: Defines the length of the time interval in which the UE is awake after the PDCCH occasion in which the PDCCH indicating initial UL or DL data is detected Value of drx-HARQ-RTT-TimerDL: Defines the length of the maximum time interval from reception of an initial DL transmission to reception of a DL retransmission.

Value of drx-HARQ-RTT-TimerDL: Defines the length of the maximum time interval from reception of the grant for initial UL transmission to reception of the grant for UL retransmission.

drx-LongCycleStartOffset: Defines the time length and starting time of the DRX cycle drx-ShortCycle (optional): Defines the time length of a short DRX cycle Here, when any one of drx-OnDurationTimer, drx-InactivityTimer, drx-HARQ-RTT-TimerDL, drx-HARQ-RTT-TimerDL is in operation, the UE performs PDCCH monitoring at every PDCCH occasion while maintaining the awake state.

5.2 RRC_IDLE DRX

In the RRC_IDLE mode and RRC_INACTIVE mode, the DRX is used to discontinuously receive a paging signal. For simplicity, DRX performed in the RRC_IDLE (or RRC_INACTIVE) state is referred to as RRC_IDLE DRX.

Thus, when DRX is configured, PDCCH monitoring/reception may be discontinuously performed in the time domain in executing the procedures and/or methods described/proposed above.

Figure 22:
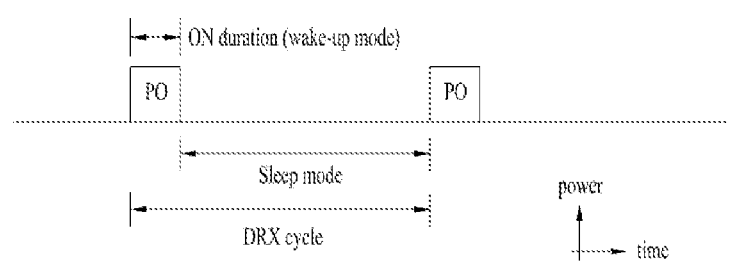
FIG. 22 illustrates a DRX cycle for paging.

FIG. 22 illustrates a DRX cycle for paging.

Referring to FIG. 22, a DRX may be configured for discontinuous reception of a paging signal. The UE may receive DRX configuration information from the base station through higher layer (e.g., RRC) signaling. The DRX configuration information may include configuration information about a DRX cycle, a DRX offset, and a DRX timer. The UE repeats the On duration and the Sleep duration according to the DRX cycle. The UE may operate in a wakeup mode in the On duration, and may operate in a sleep mode in the Sleep duration. In the wakeup mode, the UE may monitor a paging occasion (PO) in order to receive a paging message. The PO represents a time resource/period (e.g., subframe, slot) in which the UE expects to receive a paging message. PO monitoring includes monitoring the PDCCH (or MPDCCH, NPDCCH) (hereinafter, paging PDCCH) scrambled from the PO into the P-RNTI. The paging message may be included in the paging PDCCH or may be included in the PDSCH scheduled by the paging PDCCH. One or more POs may be included in a paging frame (PF). The PF may be periodically configured based on the UE ID. Here, the PF corresponds to one radio frame, and the UE ID may be determined based on the international mobile subscriber identity (IMSI) of the UE. When DRX is configured, the UE monitors only one PO per DRX cycle. When the UE receives a paging message indicating change of system information and/or the ID thereof from the PO, it may perform a RACH procedure to initialize (or re-set) connection with the base station, or receive (or acquire) new system information from the base station. Accordingly, in executing the above-described/proposed procedures and/or methods, RACH may be performed for connection with the base station, or PO monitoring may be performed discontinuously in the time domain to receive (or acquire) new system information from the base station.

FIG. 23 illustrates an extended DRX (eDRX) cycle.

According to the DRX cycle configuration, the maximum cycle duration may be limited to 2.56 seconds. However, in the case of a UE by which data transmission/reception is intermittently performed, such as an MTC UE or an NB-IoT UE, unnecessary power consumption may occur during the DRX cycle. In order to further reduce the power consumption of the UE, a method of significantly extending the DRX cycle based on a power saving mode (PSM) and a paging time window or paging transmission window (PTW) has been introduced, and the extended DRX cycle is simply referred to as an eDRX cycle. Specifically, paging hyperframes (PHs) are periodically configured based on the UE ID, and a PTW is defined in the PHs. The UE may perform a DRX cycle in the PTW duration to switch to the wakeup mode in the PO thereof to monitor the paging signal. One or more DRX cycles (e.g., wake-up mode and sleep mode) of FIG. U2 may be included in the PTW duration. The number of DRX cycles in the PTW duration may be set by the base station through a higher layer (e.g., RRC) signal.

5.3 WUS (Wake-Up Signal)

In MTC and NB-IoT, the WUS may be used to reduce power consumption related to paging monitoring. The WUS is a physical layer signal indicating whether or not the UE is to monitor a paging signal (e.g., MPDCCH/NPDCCH scrambled with P-RNTI) according to the cell configuration. For a UE for which eDRX is not configured (i.e., only DRX is configured), the WUS may be associated with one PO (N=1). On the other hand, For a UE for which eDRX is configured, the WUS may be associated with one or more POs (N>1). When a WUS is detected, the UE may monitor N POs after being associated with the WUS. On the other hand, when no WUS is detected, the UE may maintain the sleep mode by skipping PO monitoring until the next WUS is monitored.

Figure 24:
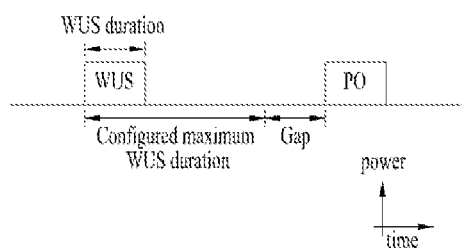
FIG. 24 illustrates a timing relationship between a WUS and a PO.

FIG. 24 illustrates a timing relationship between a WUS and a PO.

The UE may receive configuration information about the WUS from the base station and monitor the WUS based on the WUS configuration information. The configuration information for the WUS may include, for example, a maximum WUS duration, the number of consecutive POs associated with the WUS, and gap information. The maximum WUS duration represents the maximum time period in which WUS may be transmitted, and may be expressed as a ratio of the maximum number of repetitions (e.g., Rmax) related to the PDCCH (e.g., MPDCCH, NPDCCH). The UE may expect repeated WUS transmission within the maximum WUS duration, but the actual number of WUS transmissions may be less than the maximum number of WUS transmissions within the maximum WUS duration. For example, for a UE within good coverage, the number of WUS repetitions may be small. For simplicity, a resource/occasion through which the WUS may be transmitted within the maximum WUS duration is referred to as a WUS resource. The WUS resource may be defined as a plurality of consecutive OFDM symbols and a plurality of consecutive subcarriers. The WUS resource may be defined as a plurality of consecutive OFDM symbols and a plurality of consecutive subcarriers in a subframe or slot. For example, the WUS resource may be defined as 14 consecutive OFDM symbols and 12 consecutive subcarriers. The UE detecting the WUS skips monitoring the WUS until the first PO associated with the WUS is reached. When the WUS is not detected for the maximum WUS duration, the UE skips monitoring the paging signal in POs associated with the WUS (or remains in the sleep mode).

6. HARQ-ACK Transmission Method for Multiple-TB (Transport Block) Scheduling Proposed in the Present Disclosure In a system using NB-IoT or MTC, the same physical signal/channel is repeated on a per symbol basis or a per subframe basis for coverage enhancement. The UE or the base station may improve detection/decoding performance using a method such as symbol level combining of physical signals/channels that are continuously transmitted. The gain of the method such as symbol level combining may be obtained when there is no or very low mobility of the UE, and thus the radio environment is almost constant across symbols or subframes in which repetition is performed. However, this characteristic of the wireless environment is disadvantageous in that when an effect such as deep fading occurs, the reception performance of the corresponding physical signal/channel may be affected for a long period of time.

In another aspect, a cost issue regarding the resources used by the base station and an issue of limitation of scheduling between different UEs may be considered, which are caused by an increase of time resources used due to repetition. When the scale of the repetition is large, the effect of coverage enhancement may be obtained, but the amount of time resources used may increase, thereby reducing resource efficiency and obstructing scheduling occasions of other UEs.

In order to address the above-mentioned issues, the present disclosure proposes methods for transmitting HARQ-ACK when multiple-TB structure transmission is used in a system in which repetition is applied to transmission of physical signals/channels. Specifically, the methods proposed in the present disclosure may be suitable for a structure in which one or more TBs may be indicated through one DCI. However, it is apparent that the methods proposed in the present disclosure may be generally applied even when transmission using multiple DCI is performed for multiple-TB transmission. It is also apparent that the methods are applicable within the scope of the disclosure even when a physical signal/channel is transmitted on a resource semi-statically configured through SIB or RRC signaling without being triggered by DCI.

The methods proposed in the present disclosure have been described based on NB-IoT and MTC for simplicity, but it is apparent that the idea thereof are generally applicable to other communication systems having a multiple-TB structure.

The HARQ-ACK transmission scheme considered in the following description follows the methods defined below.

HARQ-ACK bundling: The representation of ACK/NACK for L HARQ processes is defined as one ACK/NACK represented by 1-bit information. In general, unless otherwise stated, when all HARQ processes on which bundling is performed are ACK, the bundled and transmitted HARQ-ACK is represented as ACK. When one or more HARQ processes are NACK, the bundled and transmitted HARQ-ACK is represented as NACK.

HARQ-ACK multiplexing: The L ACK/NACKs are represented as L-bit information, and thus ACK/NACK per L HARQ processes (or per L HARQ process groups) may be distinguished, and the L-bit information is defined to transmitted using a single HARQ-ACK channel.

Individual HARQ-ACK: This is defined to use L independent HARQ-ACK channels. In general, unless otherwise stated, it may be assumed that L independent HARQ processes use independent HARQ-ACK channels, but the information on the bundled or multiplexed L HARQ process groups may use an independent HARQ-ACK channel.

Method 1-1. Multiplexing L HARQ-ACKs into One HARQ-ACK Resource Using a Cover Code In Method 1-1, a method of multiplexing multiple HARQ-ACKs using a cover code is proposed.

Example 1-1-1

As a specific example of Method 1-1, when the UE does not make a scheduling request (SR) through HARQ-ACK resources in a system in which NB-IoT is used, the UE may be defined to distinguish HARQ-ACK for two HARQ processes using BPSK modulation and two cover codes.

As a specific method for implementing Example 1-1-1, a UE configured to perform a multiple-TB related operation through higher layer signaling such as SIB or RRC signaling may be defined such that an SR related operation using HARQ-ACK is not configured at the time same. On the other hand, a UE configured to perform an SR related operation using HARQ-ACK through higher layer signaling such as SIB or RRC signaling may be defined not to perform an SR related operation using HARQ-ACK.

As a specific method for implementing Example 1-1-1, a UE scheduled to perform a multiple-TB related operation using DCI may be defined not to perform an SR related operation using HARQ-ACK. On the other hand, a UE scheduled to perform an operation other than the multiple-TB operation by DCI may be defined to perform an SR related operation using HARQ-ACK.

In Example 1-1-1, a cover code intended for SR transmission using HARQ-ACK and a cover code for multiplexing multiple HARQ-ACKs may be the same.

In Example 1-1-1, it may be defined that ACK/NACK for one HARQ process (e.g. HARQ process #0) is distinguished using BPSK modulation, and the other HARQ process (e.g. HARQ process #1) is distinguished using a cover code.

Example 1-1-2

As a specific example of Method 1-1, when the UE is allowed to perform SR using HARQ-ACK resources in a system in which NB-IoT is used, the UE may be defined to distinguish the SR and the HARQ-ACK for two HARQ processes using BPSK modulation and 4 cover codes.

As a specific method for implementing Example 1-1-2, for a UE configured to perform both SR and multiple-TB related operations through higher layer signaling such as SIB or RRC signaling, the type and interpretation of a cover code used when the multiple-TB operation is scheduled by DCI may be different from those of a cover code used when an operation other than the multiple-TB operation is scheduled by DCI.

In Example 1-1-2, the SR is distinguished using BPSK modulation, and the multiplexing of HARQ-ACK may be distinguished using four cover codes. This may be intended for a case where when time variation of the channel is very small, the probability of a BPSK modulation detection error due to a channel estimation error may be higher than that of an orthogonal cover code detection error, and the importance of HARQ-ACK is higher that of the SR.

Example 1-1-3

As a specific example of Method 1-1, when the UE is allowed to perform the SR operation using HARQ-ACK resources in a system in which NB-IoT is used, the UE may be defined to distinguish the SR and the HARQ-ACK for two HARQ processes using 8 cover codes.

As a specific method for implementing Example 1-1-3, a UE configured to perform a multiple-TB related operation through higher layer signaling such as SIB or RRC signaling may be defined to perform four cover code-based HARQ-ACK multiplexing. In this case, if the UE is configured to perform the SR operation through higher layer signaling such as SIB or RRC signaling, it may be defined to report an operation of not requesting the same HARQ-ACK multiplexing representation and SR with four cover codes and to additionally report an operation of requesting HARQ-ACK multiplexing and the SR using four cover codes.

Method 1-2. Multiplexing L HARQ-ACKs into One HARQ-ACK Resource by Combining Cover Codes and Frequency Domain Resource Selection In Method 1-2, a method of multiplexing multiple HARQ-ACKs based on a distinction between a cover code and a frequency domain resource is proposed.

Example 1-2-1

As a specific example of Method 1-2, when the UE does not perform the SR operation through HARQ-ACK resources in a system in which NB-IoT is used, the UE may be defined to distinguish HARQ-ACK for two HARQ processes using BPSK modulation and two cover codes.

In Example 1-2-1, the UE may be configured through higher layer signaling such as SIB or RRC signaling to perform both the SR and multiple-TB related operations, but the actual configuration may be applied when only the multiple-TB related operation is performed.

In Example 1-2-1, when the UE receives, through higher layer signaling such as SIB or RRC signaling, only a configuration (or information about the configuration) for performing only the SR-related operation and does not receive a configuration (or information about the configuration) for performing the multiple-TB related operation, the cover code for multiplexing multiple HARQ-ACKs using HARQ-ACK may be the same as the cover code used for the purpose of distinguishing the SR.

In Example 1-2-1, ACK/NACK for one HARQ process (e.g. HARQ process #0) may be defined to be distinguished using BPSK modulation and the other HARQ process (e.g. HARQ process #1) may be defined to be distinguished using a cover code.

Example 1-2-2

As a specific example of Method 1-2, when the UE is allowed to perform the SR operation using HARQ-ACK resources in a system in which NB-IoT is used, the UE may be defined to distinguish the SR and the HARQ-ACK for two HARQ processes using two cover codes, two subcarrier indexes, and BPSK modulation.

As a specific method for implementing Example 1-2-2, for a UE configured through higher layer signaling such as SIB or RRC signaling to perform both the SR and multiple-TB related operations, the number of subcarriers used in the case where scheduling of the multiple-TB operation is received by DCI may be defined as 1, and the number of subcarriers used in the case where scheduling of an operation other than the multiple-TB operation is received may be defined as 2.

As a specific method for implementing Example 1-2-2, when a grant for scheduling the multiple-TB operation is received, the corresponding DCI may include information specifying one subcarrier index. For the other subcarrier information, a subcarrier in a pair relationship with the subcarrier index specified through DCI may be used. Here, the pair relationship may be expressed as an offset using the number of subcarriers in the frequency domain. When the pair determined by the offset exceeds the range of the carrier on which the UE transmits HARQ-ACK, it may be determined through a modular operation for 12.

In Example 1-2-2, the SR may be defined to be distinguished using a cover code, and multiplexing of HARQ-ACK may be defined to be distinguished using BPSK modulation and subcarrier index selection. For example, ACK/NACK for one HARQ process (e.g. HARQ process #0) may be defined to be distinguished using BPSK modulation, and the other HARQ process (e.g. HARQ process #1) may be defined to be distinguished using a subcarrier index.

Method 1-3. Multiplexing L HARQ-ACKs into One HARQ-ACK Resource Using a Cover Code and M-QAM Constellation Method 1-3 proposes a method of multiplexing multiple HARQ-ACKs based on a distinction between a cover code and M-QAM.

Example 1-3-1

As a specific example of Method 1-3, when the UE does not perform the SR through HARQ-ACK resources in a system in which NB-IoT is used, and the multiple-TB operation is scheduled by DCI, the UE may be defined to distinguish HARQ-ACK for two HARQ processes using QPSK modulation.

In Example 1-3-1, the multiple-TB related HARQ-ACK representation scheme may be intended to use QPSK modulation in both the case where the UE is configured through higher layer signaling such as SIB or RRC signaling to perform the SR related operation and the case where it is not. For the same purpose, the DMRS used on a physical channel for transmitting the multiplexed HARQ-ACK may be defined to use QPSK modulation.

Example 1-3-2

As a specific example of Method 1-3, when the UE is allowed to perform the SR using HARQ-ACK resources in a system in which NB-IoT is used, the UE may be defined to distinguish the SR and the HARQ-ACK for two HARQ processes using two cover codes and QPSK modulation.

As a specific method for implementing Example 1-3-2, when a UE configured through higher layer signaling such as SIB or RRC signaling to perform both the SR and multiple-TB related operations, a DMRS used on the physical channel for transmitting the HARQ-ACK may be defined to use QPSK modulation when the multiple-TB operation is scheduled by the DCI.

In Example 1-3-2, the SR may be defined to be distinguished using a cover code, and multiplexing of HARQ-ACKs may be defined to be distinguished using QPSK modulation.

Method 1-4. Multiplexing L HARQ-ACKs into one HARQ-ACK resource by combining a cover code and time domain resource selection In Method 1-4, a method of multiplexing multiple HARQ-ACKs based on a distinction between a cover code and a time domain resource is proposed.

Example 1-4-1

As a specific example of Method 1-4, when the UE does not perform the SR operation using HARQ-ACK resources in a system in which NB-IoT is used, the UE may be defined to distinguish HARQ-ACK for two HARQ processes using BPSK modulation and two cover codes.

In Example 1-4-1, the UE may be configured through higher layer signaling such as SIB or RRC signaling to perform both the SR and multiple-TB related operations, but the actual configuration may be applied when only the multiple-TB related operation is performed.

In Example 1-4-1, when the UE is configured through higher layer signaling such as SIB or RRC signaling to perform only SR-related operation and not to perform the multiple-TB related operation, the cover code for multiplexing multiple HARQ-ACKs based on HARQ-ACK may be the same as the cover code used for the purpose of distinguishing the SR.

In Example 1-4-1, ACK/NACK for one HARQ process (e.g. HARQ process #0) may be defined to be distinguished using BPSK modulation and the other HARQ process (e.g. HARQ process #1) may be defined to be distinguished using a cover code.

Example 1-4-2

As a specific example of Method 1-4, when the UE is allowed to perform the SR using HARQ-ACK resources in a system in which NB-IoT is used, the UE may be defined to distinguish the SR and the HARQ-ACK for two HARQ processes using two cover codes, two HARQ-ACK starting subframe indexes, and BPSK modulation.

As a specific method for implementing Example 1-4-2, for a UE configured through higher layer signaling such as SIB or RRC signaling to perform both the SR and multiple-TB related operations, the number of subcarriers used in the case where scheduling of the multiple-TB operation is receive by DCI may be defined as 1, and the number of HARQ-ACK starting subframe indexes used in the case where scheduling of an operation other than the multiple-TB operation is received may be defined as 2.

As a specific method for implementing Example 1-4-2, when a grant for scheduling the multiple-TB operation is received, the corresponding DCI may include information specifying one HARQ-ACK starting subframe index. The remaining HARQ-ACK starting subframe may be defined as a position spaced apart from the HARQ-ACK starting subframe specified through the DCI by the repetition scale of the HARQ-ACK channel. For example, when the starting subframe specified through the DCI is n1 and the repetition scale of HARQ-ACK is r, the remaining starting subframe index may be defined as n2=n1+r+1.

In Example 1-2-2, the SR may be defined to be distinguished using a starting subframe index, and multiplexing of HARQ-ACK may be defined to be distinguished using BPSK modulation and a cover code. For example, the HARQ-ACK starting subframe index specified through the DCI may be defined to be used when the SR is requested, and the other HARQ-ACK starting subframe index may be defined to be used when the SR is not requested. This may be intended to reduce latency for configuration of UL resources when the UE makes a request of the SR.

Method 1-5. Multiplexing L HARQ-ACKs into One HARQ-ACK Resource Using a Sequence Method 1-5 proposes a method of multiplexing multiple HARQ-ACKs using a sequence.

Example 1-5-1

As a specific example of Method 1-1, when the UE does not perform the SR using HARQ-ACK resources in a system in which NB-IoT is used, the UE may be defined to distinguish HARQ-ACK for two HARQ processes using 4 sequences.

When the structure in which the UE instructed to perform the Multiple-TB operation is newly introduced to perform HARQ-ACK multiplexing, designing a new HARQ-ACK channel may be possible because there is no risk of the base station and the UE confusing information of the legacy HARQ-ACK channel. Therefore, a new sequence-based HARQ-ACK reporting scheme may be introduced as in Method 1-5-1 above.

As a specific method for implementing Example 1-5-1, a sequence used to report the multiplexed HARQ-ACK may be a random sequence of length N, and a method of selecting an initialization value for generating a random sequence may be used to distinguish the HARQ-ACK state. In this case, the length N of the random sequence may be calculated as the product of the number of NB-slots required for the UE to configure the HARQ-ACK channel of the basic transmission unit and the number of symbols included in one NB-slot (e.g., N=28). When repetition is applied to the HARQ-ACK channel, transmission may be performed in a manner that the sequence of length N is repeated.

As a specific method for implementing Example 1-5-1, a sequence used to report the multiplexed HARQ-ACK may be a random sequence of length N, and the state of the HARQ-ACK may be distinguished through the method of selecting an initialization value for generating the random sequence. In this case, the length N of the random sequence may be the number of symbols necessary for the UE to perform all repetitions applied to the HARQ-ACK channel of the basic transmission unit. When the repetition whose scale is R is applied to the HARQ-ACK channel composed of M symbols, N may be calculated as N=M*R. In this case, the initialization value of the random sequence may be defined to be initialized at a time when the HARQ-ACK channel starts and to be maintained during the repetition.

As a specific method for implementing Example 1-5-1, when a sequence used to report the multiplexed HARQ-ACK is a random sequence, the method of selecting an initialization value for generation of the random sequence may include information for randomization of interference between cells. Here, the information for randomization may be Cell ID information acquired on an anchor carrier and/or a value explicitly configured through signaling of the base station.

As a specific method for implementing Example 1-5-1, the sequence used to report the multiplexed HARQ-ACK may be a predefined sequence of length-28 and may be configured such that a predetermined sequence is selected in a predefined list according to the state of HARQ-ACK.

When the method of Example 1-5-1 is used, the UE skips transmitting a separate DMRS in transmission of the HARQ-ACK channel.

The method of Example 1-5-1 may be intended to have the same HARQ-ACK representation scheme regardless of whether or not the UE performing the multiple-TB related operation performs the SR related operation.

Example 1-5-2

As a specific example of Method 1-5, in a system in which NB-IoT is used, when the UE is allowed to perform the SR using HARQ-ACK resources, the UE may be defined to distinguish the SR and the HARQ-ACK for two HARQ processes using 8 sequences.

The method of Example 1-5-2 may be defined to conform to the sequence generation method defined in Example 1-5-1. In this case, in addition to the four sequences used in Example 1-5-1, four sequences for reporting HARQ-ACK information by distinguishing the operation of requesting the SR may be added.

Method 1-6. Multiplexing L HARQ-ACKs into one HARQ-ACK resource by combining a cover code and a frequency domain resource In Method 1-6, a method of multiplexing multiple HARQ-ACKs based on a distinction between a cover code and a frequency domain resource is proposed.

Example 1-6-1

As a specific example of Method 1-6, when the UE does not perform the SR using HARQ-ACK resources in a system in which NB-IoT is used, the UE may be defined to distinguish the HARQ-ACK for two HARQ processes using two subcarrier indexes and BPSK modulation.

In Example 1-6-1, the UE may be configured through higher layer signaling such as SIB or RRC signaling to perform both the SR and multiple-TB related operations, but the actual configuration may be applied when only the multiple-TB related operation is performed. In this case, the number of subcarriers used in the case where scheduling of the multiple-TB operation is received by DCI may be defined as 1, and the number of subcarriers used in the case where scheduling of an operation other than the multiple-TB operation is received may be defined as 2.

As a specific method for implementing Example 1-6-1, when a grant for scheduling the multiple-TB operation is received, the corresponding DCI may include information specifying one subcarrier index. For the other subcarrier information, a subcarrier in a pair relationship with the subcarrier index specified by the DCI may be used. Here, the pair relationship may be expressed as an offset using the number of subcarriers in the frequency domain. When the pair determined by the offset exceeds the range of the carrier on which the UE transmits HARQ-ACK, it may be determined through a modular operation for 12.

In Example 1-6-1, multiplexing of HARQ-ACKs may be defined to be distinguished using BPSK modulation and a subcarrier index. As an example, one of the two configured subcarriers may be used to distinguish ACK/NACK of one HARQ process (e.g. HARQ process #0) using BPSK modulation, and the other subcarrier may be used to distinguish ACK/NACK of the other HARQ process (e.g. HARQ process #1) using BPSK modulation.

As a specific method for implementing Example 1-6-1, when a grant for scheduling the multiple-TB operation is received, the scale of repetition of the HARQ-ACK that is actually used varies depending on whether the HARQ processes are ACK/NACK. For example, when the repetition scale of HARQ-ACK scheduled through the grant for scheduling the multiple-TB operation is R, and the two HARQ processes are ACK, the UE may transmit HARQ-ACK representing the ACK, using two subcarriers. In this case, repetition having a scale of 2*R may be applied to the transmission of the HARQ-ACK. When the two HARQ processes are both NACK, the UE may transmit HARQ-ACK representing NACK, using the two subcarriers. In this case, repetition having a scale of 2*R may be applied to the transmission of the HARQ-ACK. When one of the two HARQ processes is ACK and the other process is NACK, the UE may transmit HARQ-ACK only on the subcarrier corresponding to the ACK, and the subcarrier corresponding to the NACK may not be used for transmission. The scale of the repetition used in this case may be R.

With the method of Example 1-6-1, the UE performing the multiple-TB related operation transmits HARQ-ACK using an independent subcarrier, and accordingly independent HARQ-ACK may be acquired. Further, in some cases (e.g., a case where one HARQ-ACK is ACK and the other is NACK), a power consumption gain of the UE may be obtained by reducing the scale of repetition necessary for transmission of HARQ-ACK. In the case of NB-IoT, the UE is assumed to always transmit the maximum power in the transmission of the NPUSCH to which repetition is applied, and the power per subcarrier may be doubled when only one subcarrier is used.

Example 1-6-2

As a specific example of Method 1-6, when the UE is allowed to perform the SR using HARQ-ACK resources in a system in which NB-IoT is used, the UE may be defined to distinguish the SR and HARQ-ACK for two HARQ processes using two cover codes, two subcarrier indexes, and BPSK modulation.

Example 1-6-2 may be used as a method of piggybacking the SR in the method proposed in 1-6-1. In this case, the transmission of the SR may be distinguished by applying a cover code to the transmission of the HARQ-ACK determined by the method proposed in 1-6-1.

The method proposed in Example 1-6-2 may unify operations of the UE for transmitting the SR by applying the SR representation scheme used in the existing standard to the method proposed in 1-6-1.

Method 2-1. Individually Transmitting L HARQ-ACKs on L HARQ-ACK Resources Using ACK or Discontinuous Transmission (DTX) Scheme Method 2-1 proposes a method of individually transmitting multiple HARQ-ACKs using an ACK or DTX scheme.

In the case of NB-IoT or MTC of each HARQ process, repetition may be applied to transmission of HARQ-ACK for the purpose of coverage enhancement. When multiple HARQ processes are represented using independent HARQ-ACK channels, the required power consumption of the UE for transmission and the time latency for checking a grant for the next scheduling may be greatly increased.

In order to address such issues, the present disclosure proposes that the ACK or DTX scheme be used for individually configured HARQ-ACK resources. A specific method may be used in combination with one or more of the following options.

Option 2-1-1: Each HARQ process may be configured with an independent HARQ-ACK resource in the corresponding time-frequency domain. In this case, when the HARQ process corresponding to the HARQ-ACK resource is determined as ACK, the UE transmits ACK information on the HARQ-ACK resource. In contrast, when the HARQ process corresponding to the HARQ-ACK resource is determined as NACK, the UE performs the DTX operation not to perform transmission on the HARQ-ACK resource.

Option 2-1-2: When all HARQ processes for which configuration information has been received through one DCI are determined as NACK, the UE may transmit information on all NACKs using HARQ-ACK resources.

Option 2-1-3: The UE may be assigned a resource constituting an additional HARQ-ACK resource on which information of all ACKs by which all HARQ processes are determined as ACK and information of all NACKs by which all HARQ processes are determined as NACK may be transmitted, and distinctively transmit the information of all ACKs or all NACKs using this resource.

Example 2-1-1

As a specific example of Method 2-1, when the method of option 2-1-1 is applied in a system in which NB-IoT or MTC is used, HARQ-ACK resources for L HARQ processes may be configured at L independent positions in the time domain. In this case, the UE may perform ACK/NACK reporting in a manner that ACK information is transmitted only when the corresponding HARQ process is ACK at the position of a HARQ-ACK resource corresponding to the HARQ process. As an example, in consideration of the capability of the NB-IoT UE, 2 may be set as the maximum value of L. In the case of MTC, L=8 may be used in CE mode A, and L=2 may be used in CE mode B.

When the UE is configured to transmit SR using HARQ-ACK and one or more HARQ processes is ACK, the UE may piggyback and transmit SR information on ACK transmission using a cover code. This means that the transmission of HARQ-ACK conforms to the conventional SR operation for piggybacking and transmitting the SR.

In the all NACK situation in which the UE is configured to transmit an SR using a dedicated SR (e.g., an SR using an NPRACH resource or an SPS structure) resource and all HARQ processes are NACKs, when there is a dedicated SR resource transmittable at a configured HARQ-ACK resource position, the UE may perform SR transmission using the same. This is because, in the case of all NACKs, the UE does not transmit HARQ-ACK, and thus there is no resource to use to report an SR, while an occasion using a separately configured SR resource may be utilized.

With the method of Example 2-1-1, power consumption may be reduced because the UE performs the DTX operation in the case of NACK. In addition, the probability of DTX-to-ACK is relatively very low. In addition, even when ACK-to-DTX occurs, only retransmission of the same TB occurs. Accordingly, the issue related to a soft buffer management for the HARQ process management of the UE may not be raised.

Example 2-1-2

As a specific example of Method 2-1, when the methods of Option 2-1-1 and Option 2-1-2 are applied together in a system in which NB-IoT or MTC is used, HARQ-ACK resources for L HARQ processes may be configured at L independent positions in the time domain. In this case, when all L HARQ processes are ACKs, the UE transmits ACK information using all the L HARQ-ACK resources. When only some of the L HARQ processes are ACK and the rest are NACKs, the UE transmits ACK information only on the HARQ-ACK resources corresponding to the HARQ processes determined as ACK, and does not perform transmission on the HARQ-ACK resources corresponding to the HARQ processes determined as NACK. When all the L HARQ processes are NACK, the UE may represent and transmit NACK information on the resource of the foremost HARQ-ACK.

When the UE is configured to transmit an SR using HARQ-ACK, the UE may transmit the SR by piggybacking the same on transmission of ACK or NACK, not DTX. This means that the transmission of HARQ-ACK conforms to the conventional SR operation of piggybacking and transmitting the SR.

When the UE transmits all NACK information for L HARQ processes using the foremost HARQ-ACK resource, the UE may monitor the search space or search space candidate from the time X ms after the end position of the HARQ-ACK resource used for transmission of NACK. In this case, when the base station receives the NACK on the transmission resource of the HARQ-ACK, it may transmit DCI in an available search space (or search space candidate) from the time X ms after the end position of the received HARQ-ACK resource. Here, X is the size of the gap in consideration of the processing time of the base station and the UE, and a value defined by the standard may be fixedly used therefor.

From the UE perspective, the method of Example 2-1-2 may obtain a gain of power consumption reduction, and may be configured to allow the base station to distinguish between the case of all NACKs and the case of DCI omission. In addition, when all NACKs are reported, the UE may quickly monitor a search space appearing thereafter, thereby saving a timing delay until receiving a grant for the next scheduling.

Example 2-1-3

As a specific example of Method 2-1, when the methods of Option 2-1-1 and Option 2-1-3 are applied together in a system in which NB-IoT or MTC is used, HARQ-ACK resources for L HARQ processes (hereinafter, defined and described as "HARQ-ACK first resources") may be configured at L independent positions in the time domain. Additionally, one HARQ-ACK resource (hereinafter, defined and described as a "HARQ-ACK second resource") for transmission of all ACKs and all NACKs may be further configured. As an example, the HARQ-ACK second resource added at this time may be distinguished through a resource different from the L HARQ-ACK first resources in the frequency domain, and the foremost HARQ-ACK first resource among the L HARQ-ACK first resources may be defined to be aligned with the starting time of the HARQ-ACK second resource in the time domain. In this case, when only some of the L HARQ processes are ACK and the rest are NACK, the UE transmits ACK information only on the HARQ-ACK first resources corresponding to the HARQ processes determined as ACK, and does not perform transmission on the HARQ-ACK first resources corresponding to the HARQ processes determined as NACK and the HARQ-ACK second resource. When all L HARQ processes are ACK, the UE represents and transmits ACK information on the HARQ-ACK second resource, and does not use the HARQ-ACK first resources. When all L HARQ processes are NACK, the UE represents and transmits NACK information on the HARQ-ACK second resource, and does not use the HARQ-ACK first resources.

When the UE is configured to transmit an SR using HARQ-ACK, the UE may transmit the SR by piggybacking the same on transmission of ACK or NACK, not DTX. This means that the transmission of HARQ-ACK conforms to the conventional SR operation of piggybacking and transmitting the SR.

When the UE performs transmission using the HARQ-ACK first resources, the UE may be allowed to monitor the search space (or search space candidate) from the time X ms after the position where the last HARQ-ACK first resource in order among the L configured HARQ-ACK first resources ends. When the UE performs transmission using the HARQ-ACK second resource, the UE may be allowed to monitor the search space (or search space candidate) from the time X ms after the position where the HARQ-ACK second resource ends. In this case, the base station may transmit DCI in an available search space (or search space candidate) from the time X ms after the position where the configured interval of all the HARQ-ACK first resources ends in the case where the transmission resource of the received HARQ-ACK is a HARQ-ACK first transmission resource, or after the position where the configured interval of the HARQ-ACK second resource ends in the case where the transmission resource of the received HARQ-ACK is the HARQ-ACK second resource. Here, X is the size of the gap in consideration of the processing time of the base station and the UE, and a value defined by the standard may be fixedly used therefor.

From the UE perspective, the method of Example 2-1-3 may obtain a gain of power consumption reduction, and may be configured to allow the base station to distinguish between the case of all NACKs and the case of DCI omission. In addition, when all ACKs or all NACKs are reported, the UE may quickly monitor a search space appearing thereafter, thereby, thereby saving (or reducing) a timing delay until receiving a grant for the next scheduling by.

Method 2-2. Individually Transmitting L HARQ-ACKs on L HARQ-ACK Resources Using the NACK or Discontinuous Transmission (DTX) Scheme Method 2-2 proposes a method of individually transmitting multiple HARQ-ACKs using a NACK or DTX scheme.

With the proposed ACK or DTX scheme, reliability of ACK may be enhanced because the UE transmits HARQ-ACK in the case of ACK. For example, since the base station determines the number of repetitions of transmission of HARQ-ACK in consideration of the channel environment such as the coverage condition of the UE, the probability of occurrence of an ACK-to-DTX error (i.e., the UE transmits ACK, but the base station fails in decoding and recognizes the same as DTX) may be relatively low. Even when the ACK-to-DTX error is produced, the base station may determine the same as NACK and schedule retransmission without change of NDI. Accordingly, transmission reliability may be ensured. On the other hand, the base station considers the coverage condition of the UE in determining the repetition scale of the (N)PDSCH for transmission of DL data. Accordingly, the probability of ACK for the UE succeeds in decoding may be generally higher than the probability of occurrence of NACK.

In consideration of such a phenomenon, the present disclosure proposes that the ACK or DTX scheme be used on the individually configured HARQ-ACK resources. A specific method may be used in combination with one or more of the following options.

Option 2-2-1: Each HARQ process may be configured with an independent HARQ-ACK resource in the corresponding time-frequency domain. In this case, when the HARQ process corresponding to the HARQ-ACK resource is determined as ACK, the UE performs the DTX operation of skipping transmission on the HARQ-ACK resource. In contrast, when the HARQ process corresponding to the HARQ-ACK resource is determined as NACK, the UE represents and transmits the NACK information on the HARQ-ACK resource.

Option 2-2-2: When all HARQ processes for which configuration information has been received through one DCI are determined as ACK, the UE may transmit information on all ACKs using HARQ-ACK resources.

Option 2-2-3: A HARQ-ACK resource on which information of all ACKs by which all HARQ processes are determined as ACK and information of all NACKs by which all HARQ processes are determined as NACK may be transmitted may be additionally configured, and the UE may distinctively transmit the information of all ACKs or all NACKs using this resource.

Example 2-2-1

As a specific example of Method 2-2, when the method of option 2-1-1 is applied in a system in which NB-IoT or MTC is used, HARQ-ACK resources for L HARQ processes may be configured at L independent positions in the time domain. In this case, the UE may perform ACK/NACK reporting in a manner that it transmits ACK information only when the corresponding HARQ process is NACK at the position of a HARQ-ACK resource corresponding to each HARQ process. As an example, 2 may be set as the maximum value of L in consideration of the capability of the NB-IoT UE. In the case of MTC, L=8 may be used in CE mode A, and L=2 may be used in CE mode B.

When the UE is configured to transmit SR using HARQ-ACK, and one or more HARQ processes is NACK, the UE may piggyback and transmit SR information on transmission of NACK using a cover code. This means that the transmission of HARQ-ACK conforms to the conventional SR operation of piggybacking and transmitting the SR.

In the all ACK situation in which the UE is configured to transmit an SR using a dedicated SR (e.g., SR using an NPRACH resource or an SPS structure) resource and all HARQ processes are ACK, when there is a dedicated SR resource transmittable at a configured HARQ-ACK resource position, the UE may perform SR transmission using the same. This is because, in the case of all ACKs, the UE does not transmit HARQ-ACK, and thus there is no resource to use to report the SR, while an occasion using a separately configured SR resource may be utilized.

With the method of Example 2-2-1, power consumption may be reduced because the UE performs the DTX operation in the case of ACK. In addition, assuming that the base station generally schedules sufficient MCS/repetition in consideration of the MCL of the UE, a more advantageous effect may be expected in that the probability of occurrence of ACK is high.

Example 2-2-2

As a specific example of Method 2-2, when the methods of Option 2-2-1 and Option 2-2-2 are applied together in a system in which NB-IoT or MTC is used, HARQ-ACK resources for L HARQ processes may be configured at L independent positions in the time domain. In this case, when all the L HARQ processes are NACK, the UE transmits NACK information using all the L HARQ-ACK resources. When only some of the L HARQ processes are ACK and the rest are NACK, the UE transmits NACK information only on the HARQ-ACK resources corresponding to the HARQ processes determined as NACK, and does not perform transmission on the HARQ-ACK resources corresponding to the HARQ processes determined as ACK. When all the L HARQ processes are ACK, the UE may represent and transmit ACK information on the foremost HARQ-ACK resource.

When the UE is configured to transmit an SR using HARQ-ACK, the UE may transmit the SR by piggybacking the same on transmission of ACK or NACK, not DTX. This means that the transmission of HARQ-ACK conforms to the conventional SR operation of piggybacking and transmitting the SR.

When the UE transmits all ACK information for L HARQ processes using the foremost HARQ-ACK resource, the UE may monitor the search space or search space candidate from the time X ms after the end position of the HARQ-ACK resource used for transmission of ACK. In this case, when the base station receives the ACK on the transmission resource of the HARQ-ACK, it may transmit DCI in an available search space (or search space candidate) from the time X ms after the end position of the received HARQ-ACK resource. Here, X is the size of the gap in consideration of the processing time of the base station and the UE, and a value defined by the standard may be fixedly used therefor.

From the UE perspective, the method of Example 2-2-2 may obtain a gain of power consumption reduction. In particular, when the MCS and the repetition scale to satisfy the MCL of the HARQ-ACK transmission channel are used, power consumption reduction through more DTX operations may be maximized because the probability of occurrence of ACK transmission is very low. In addition, the method may be configured to allow the base station to distinguish between the case of all ACKs and the case of DCI omission. When all NACKs are reported, the UE may quickly monitor a search space appearing thereafter, thereby reducing a timing delay until receiving a grant for the next scheduling.

Example 2-2-3

As a specific example of Method 2-1, when the methods of Option 2-2-1 and Option 2-2-3 are applied together in a system in which NB-IoT or MTC is used, HARQ-ACK resources for L HARQ processes (hereinafter, defined and described as "HARQ-ACK first resources") may be configured at L independent positions in the time domain. Additionally, one HARQ-ACK resource (hereinafter, defined and described as a "HARQ-ACK second resource") for transmission of all ACKs and all NACKs may be further configured. As an example, the HARQ-ACK second resource added at this time may be distinguished through a resource different from the L HARQ-ACK first resources in the frequency domain, and the foremost HARQ-ACK first resource among the L HARQ-ACK first resources may be defined to be aligned with the starting time of the HARQ-ACK second resource in the time domain. In this case, when only some of the L HARQ processes are ACK and the rest are NACK, the UE transmits NACK information only on the HARQ-ACK first resources corresponding to the HARQ processes determined as NACK, and does not perform transmission on the HARQ-ACK first resources corresponding to the HARQ processes determined as ACK and the HARQ-ACK second resource. When all the L HARQ processes are ACK, the UE represents and transmits ACK information on the HARQ-ACK second resource, and does not use the HARQ-ACK first resources. When all the L HARQ processes are NACK, the UE represents and transmits NACK information on the HARQ-ACK second resource, and does not use the HARQ-ACK first resources.

When the UE is configured to transmit an SR using HARQ-ACK, the UE may transmit the SR by piggybacking the same on transmission of ACK or NACK, not DTX. This means that the transmission of HARQ-ACK conforms to the conventional SR operation of piggybacking and transmitting the SR.

When the UE performs transmission using the HARQ-ACK first resources, the UE may be allowed to monitor the search space (or search space candidate) from the time X ms after the end position of the last HARQ-ACK first resource in order among the L configured HARQ-ACK first resources. When the UE performs transmission using the HARQ-ACK second resource, the UE may be allowed to monitor the search space (or search space candidate) from the time X ms after the end position of the HARQ-ACK second resource. In this case, when the transmission resource of the received HARQ-ACK is a HARQ-ACK first transmission resource, the base station may transmit DCI in an available search space (or search space candidate) from the time X ms after the end position of the configured interval of all the HARQ-ACK first resources in the case where transmission resource of the received HARQ-ACK is a HARQ-ACK first resource, or after the end position of the configured interval of the HARQ-ACK second resource in the case where transmission resource of the received HARQ-ACK is the HARQ-ACK second resource. Here, X is the size of the gap in consideration of the processing time of the base station and the UE, and a value defined by the standard may be fixedly used therefor.

From the UE perspective, the method of Example 2-2-3 may obtain a gain of power consumption reduction, and may be configured to allow the base station to distinguish between the case of all ACKs and the case of DCI omission. When all ACKs or all NACKs are reported, the UE may quick monitor a search space appearing thereafter, thereby reducing a timing delay until receiving a grant for the next scheduling.

Method 3-1: When the UE receives scheduling of the multiple-TB operation, the UE may determine a HARQ-ACK transmission method according to a specific condition.

Method 3-1 proposes a method of determining a HARQ-ACK transmission method when the UE receives scheduling of the multiple-TB operation. In this case, as a HARQ-ACK transmission method that may be selected, HARQ-ACK bundling, HARQ-ACK multiplexing, or an individual HARQ-ACK scheme may be considered.

The determination of the HARQ feedback method is based on the principle of avoiding ACK/NACK bundling when it may be determined that the radio channel environment is relatively good (e.g., low CE level or a small number of repetitions, CE mode A, high MCS, etc.). That is, ACK/NACK bundling may cause unnecessary repetitive transmission for a TB already determined as ACK because when even one TB determined as NACK in a bundling unit may result in retransmission of all TBs in the bundle. What makes this issue more serious is that a lot of resources is required per TB retransmission when the radio channel environment is relatively poor.

In Method 3-1, the specific condition may be information indicated by higher layer signaling such as SIB or RRC signaling. In this case, information included in the higher layer signaling may be used in combination with one or more of the following options.

Option 3-1-1: Information explicitly indicating the HARQ-ACK transmission scheme may be included in higher layer signaling.

Option 3-1-2: The HARQ-ACK transmission scheme may be determined based on indication information related to the coverage of the UE in the information included in the higher layer signaling. For example, in the case of MTC or NB-IoT, information on the maximum scale Rmax by which the MPDCCH or NPDCCH may be repeated may be used as a reference for the specific condition. As another example, in the case of MTC, information on the CE mode to determine the transmission/reception operation of the UE in the RRC connected mode may be used as a reference for the specific condition.

Option 3-1-3: In the HARQ-ACK transmission scheme, resource allocation information for a shared channel (SCH) to be used by the UE, which is in the information included in the higher layer signaling, may be used. For example, in the case of NB-IoT, information for determining whether to perform single-tone transmission of the UE or information for determining subcarrier spacing may be used as a reference for the specific condition.

In Method 3-1, the specific condition may be information indicated by DCI or a specific signal. Here, the information transmitted through the DCI or the specific signal may be used in combination with one or more of the following options.

Option 3-1-4: Information explicitly indicating the HARQ-ACK transmission scheme may be included in the DCI or the specific signal.

Option 3-1-5: The HARQ-ACK transmission scheme may be an actual repetition scale of a DL control channel included in the DCI or the specific signal. For example, in the case of NB-IoT, the UE may recognize the repetition scale of the NPDCCH used for transmission of the DCI based on the information included in the DCI, and this scale may be used as a reference for the specific condition.

Option 3-1-6: The HARQ-ACK transmission scheme may be resource allocation information about a scheduled DL-SCH among the pieces of information included in the DCI or the specific signal. For example, in the case of NB-IoT or MTC, a DL grant may include information on the repetition scale of the scheduled NPDSCH or MPDSCH, a TBS, and/or a scheduling delay, and the number of HARQ processes may be indicated when multiple-TB transmission is scheduled. One or more of these pieces of information may be combined and used as a reference for the specific condition.

Option 3-1-7: The HARQ-ACK transmission scheme may be resource allocation information about a scheduled HARQ-ACK channel among the pieces of information included in the DCI or the specific signal. For example, in the case of NB-IoT or MTC, the DL grant may include a repetition scale of a HARQ-ACK channel, a scheduling delay, and/or a frequency position, and one or more of these pieces of information may be combined and used as a reference for the specific condition.

Option 3-1-8: The HARQ-ACK transmission scheme may be information indicating whether to perform retransmission or instructing early termination of an ongoing HARQ process among the pieces of information included in the DCI. For example, a retransmission request using compact DCI or an arbitrary signal or a request for termination of an ongoing HARQ process may be used, and such information may be used as a reference for the specific condition.

In Method 3-1, the specific condition may be a transmission time at which the UE transmits HARQ-ACK. As a specific method, the following options may be used.

Option 3-1-9: The HARQ-ACK transmission scheme may be determined according to positions of resources on which the UE transmits HARQ-ACK. For example, different HARQ-ACK channel transmission schemes may be defined to be used for a resource of a HARQ-ACK channel available before all HARQ processes scheduled by the DCI are terminated and a resource of the HARQ-ACK channel available after all the HARQ processes are terminated.

Example 3-1-1

As a specific example of Method 3-1, in a system in which NB-IoT is used, when Rmax, which is used for the purpose of monitoring a user search space (USS), is used as a condition for determining a transmission scheme of the HARQ-ACK channel as in Option 3-1-2, the individual HARQ-ACK scheme may be defined to be used when Rmax is less than or equal to a specific value, and the HARQ-ACK bundling or multiplexing scheme may be defined to be used when Rmax exceeds the specific value.

The value of Rmax may be configured in consideration of the characteristics of the radio channel environment (e.g. MCL) of the UE. Accordingly, the method of Example 3-1-1 may be intended to prevent unnecessary retransmissions by distinguishing ACK/NACK for each HARQ process when the radio channel environment is good and to lower the probability of an ACK-to-NACK error (i.e., a case where the UE transmits ACK, but the base station recognizes the same as NACK) by increasing the reliability of HARQ-ACK reporting when the radio channel environment is not good.

Alternatively, HARQ-ACK multiplexing or bundling may be defined to be used when Rmax is less than or equal to a specific value, and the individual HARQ-ACK scheme may be defined to be used when Rmax exceeds the specific value. When the repetition scale is small, the effect of time diversity is relatively low, and thus different HARQ processes may experience a similar level of radio channel environment. This scheme may be intended to apply bundling or multiplexing in consideration of this case. It may also be intended to reduce unnecessary retransmissions caused by an ACK to NACK error when the repetition scale is large.

Example 3-1-2

As a specific example of Method 3-1, when a CE mode in which the UE operates as in Option 3-1-2 is used as a condition for determining the transmission scheme for the HARQ-ACK channel in a system in which MTC is used, the individual HARQ-ACK scheme may be defined to be used in the case of CE mode A, and the HARQ-ACK bundling or multiplexing scheme may be defined to be used in the case of CE mode B.

The CE mode may be configured in consideration of the characteristics of the radio channel environment (e.g. MCL) of the UE. Accordingly, the method of Example 3-1-2 may be intended to prevent unnecessary retransmissions by distinguishing ACK/NACK for each HARQ process when the radio channel environment is good and to lower the probability of an ACK to NACK error (i.e., a case where the UE transmits ACK, but the base station recognizes the same as NACK) by increasing the reliability of HARQ-ACK reporting when the radio channel environment is not good.

Alternatively, the HARQ-ACK bundling or multiplexing scheme may be defined to be used in the case of CE mode A, and the HARQ-ACK multiplexing or the individual HARQ-ACK scheme may be defined to be used in the case of CE mode B. In the case of CE mode A, the repetition scale is small, and accordingly the effect of time diversity is relatively low, and different HARQ processes may experience a similar level of radio channel environment. In this regard, this method is intended to reduce resource overhead using bundling. In contrast, in the case of CE mode B, if HARQ-ACK bundling is used, resource overhead and an increase in timing latency may become severe due to unnecessary retransmissions when the ACK to NACK error is produced.

Example 3-1-3

As a specific example of Method 3-1, in a system in which NB-IoT is used, whether to apply single-tone transmission of the NPUSCH to be used by the UE is used as a condition for determining the transmission scheme for the HARQ-ACK channel as in Option 3-1-3, the individual HARQ-ACK scheme may be defined to be used when multi-tone transmission is configured, and the HARQ-ACK bundling or multiplexing scheme may be defined to be used when single-tone transmission is configured.

Time domain resources required for transmission of the HARQ-ACK channel from the UE may be relatively increased in the case of single-tone transmission. The method of Example 3-1-3 may be intended to prevent this event. In this case, the HARQ-ACK channel for DL transmission scheduled with multiple-TB may be defined to use a multi-carrier type.

Example 3-1-4

As a specific example of Method 3-1, in a system in which NB-IoT is used, when the subcarrier spacing of the NPUSCH to be used by the UE is used as a condition for determining a transmission scheme for the HARQ-ACK channel as in Option 3-1-3, the HARQ-ACK bundling or multiplexing scheme may be defined to be used when a subcarrier spacing of 3.75 kHz is configured.

The time domain resources required for transmission of the HARQ-ACK channel by the UE may be relatively increased in the case of the subcarrier spacing of 3.75 kHz. The method of Example 3-1-4 may be intended to prevent this even.

Example 3-1-5

As a specific example of Method 3-1, in a system in which NB-IoT is used, when the actual repetition scale of the NPDCCH used for transmission of the DCI detected by the UE is used as a condition for determining the transmission scheme for the HARQ-ACK channel as in Option 3-1-5, the individual HARQ-ACK scheme may be defined to be used when the repetition scale is less than or equal to a specific value, and the HARQ-ACK bundling or multiplexing scheme may be defined to be used when the repetition scale exceeds the specific value.

The value of the repetition may be configured in consideration of the characteristics of the radio channel environment (e.g. MCL) of the UE. Accordingly, the method of Example 3-1-5 may be intended to prevent unnecessary retransmissions by distinguishing ACK/NACK for each HARQ process when the radio channel environment is good and to lower the probability of an ACK to NACK error (i.e., a case where the UE transmits ACK, but the base station recognizes the same as NACK) by increasing the reliability of HARQ-ACK reporting when the radio channel environment is not good.

Alternatively, the HARQ-ACK multiplexing or bundling scheme may be defined to be used when the repetition scale is less than or equal to the specific value, and the individual HARQ-ACK scheme may be defined to be used when the repetition scale exceeds the specific value. When the repetition scale is small, the effect of time diversity is relatively low, and thus different HARQ processes may experience a similar level of radio channel environment. This method may be intended to apply bundling or multiplexing in consideration of this case. It may also be intended to reduce unnecessary retransmissions caused by the ACK to NACK error when the repetition scale is large.

Example 3-1-6

As a specific example of Method 3-1, in a system in which NB-IoT is used, when the repetition scale of the HARQ-ACK channel scheduled by the DCI detected by the UE is used as a condition for determining the transmission scheme for the HARQ-ACK channel as in Option 3-1-7, the individual HARQ-ACK scheme may be defined to be used when the repetition scale is less than or equal to a specific value, and the HARQ-ACK bundling or multiplexing scheme may be defined to be used when the repetition scale exceeds the specific value.

The method of Example 3-1-6 may be intended to enhance the reliability of ACK/NACK information using independent HARQ-ACK transmissions when the repetition value of the HARQ-ACK transmission channel is small and thus the latency issue is low, and to reduce the latency by increasing radio resource efficiency when the repetition value is large.

In the method of Example 3-1-6, a section in which the repetition scale exceeds the specific value may be divided into a section in which HARQ-ACK bundling is applied (relatively high repetition) and a section (relatively high repetition) in which multiplexing is performed.

Method 3-2. Determining a Scheme for Applying HARQ-ACK Bundling by a Specific Condition when a UE that May Expect Multiple-TB Scheduling is Allowed to Perform HARQ-ACK Feedback Using HARQ-ACK Bundling In Method 3-2, it is proposed that when the UE may expect multiple-TB scheduling using one DCI and is configured to use HARQ-ACK bundling as a HARQ-ACK transmission scheme for scheduled TBs, a scheme for applying HARQ-ACK bundling be determined by a specific condition. In this case, the scheme for applying HARQ-ACK bundling may be the size of the bundling (i.e., the number of pieces of ACK/NACK information bundled in one HARQ-ACK feedback channel) or whether bundling is applied.

In general, when HARQ-ACK bundling is used, UL resources may be saved, power consumption for UL transmission of the UE and the latency in completing the HARQ process may be reduced because ACK/NACK reports for a plurality of TBs are transmitted in a bundled manner. On the other hand, since HARQ-ACK bundling uses only 1 bit information, it may cause increase unnecessary retransmissions when the base station fails to decode HARQ-ACK feedback for ACK or when ACK and NACK information must be reported together. In multiple-TB scheduling, various transmission structures may be considered, and HARQ-ACK feedback transmission schemes suitable for the respective transmission structures may differ from each other.

In order to address the aforementioned issues, the present disclosure proposes that a scheme for applying HARQ-ACK bundling be determined according to a condition as in Method 3-2. A specific method may be used in combination with one or more of the following options.

Option 3-2-1: When an interleaving transmission pattern is applied to TB transmission, HARQ-ACK bundling may be defined to be performed. When interleaved transmission is not applied to the TB transmission, HARQ-ACK bundling is not performed. Here, the interleaving transmission pattern refers to a pattern in which scheduled TBs are alternately transmitted while being repeated in a situation where a plurality of TBs is scheduled to be transmitted by applying repetition.

Option 3-2-2: the size of HARQ-ACK bundling may be defined to be determined depending on whether to apply the interleaving transmission pattern to TB transmission. In this case, the size of the bundling may also vary according to the form of the interleaving transmission pattern.

Option 3-2-3: When HARQ-ACK bundling is applied, the size of the bundling and whether to apply the same may be determined in consideration of the number of scheduled TBs.

Option 3-2-4: When HARQ-ACK bundling is applied, the size of the bundling and whether to apply the same may be determined based on whether different HARQ-ACK feedback transmissions overlap each other. Here, overlapping between different HARQ-ACK feedback transmissions mean full or partial overlapping between the time-frequency resource regions in which different HARQ-ACK feedback channels are transmitted.

Option 3-2-5: When HARQ-ACK bundling is applied, the size of the bundling and whether to apply the same may be determined by a frame structure supported by the network and/or a duplex mode in which the UE operates. Here, the frame structure and the duplex mode may be one of full duplex-FDD (FD-FDD), half duplex-FDD (HD-FDD), or TDD. In the case of TDD, a distinction of UL/DL configuration that determines a pattern in which a UL subframe and a DL subframe appear may be included.

Example 3-2-1

As a specific example of Method 3-2, in a system in which MTC or NB-IoT is used, whether to apply HARQ-ACK bundling may be defined to be determined depending on whether an interleaving transmission pattern is applied as in Option 3-2-1. Specifically, when the interleaving transmission pattern is applied, HARQ-ACK bundling may be defined to be performed. On the other hand, when the interleaving transmission pattern is not applied, HARQ-ACK bundling may be defined not to be performed.

In general, when HARQ-ACK bundling is applied, the efficiency of radio resource utilization may increase when the TBs subject to bundling yield similar decoding results. When the TBs subject to bundling undergo similar radio channel environments, a similar level of decoding performance may be expected. When the interleaving transmission pattern is applied, scheduled TBs may undergo radio channel environments similar to each other. The method of Example 3-2-1 may be intended to increase the efficiency of radio resource utilization in consideration of the aforementioned feature.

Example 3-2-2

As a specific example of Method 3-2, in a system in which MTC or NB-IoT is used, the size of HARQ-ACK bundling may be defined to be determined according to whether an interleaving transmission pattern is applied as in Option 3-2-2.

As a specific method of Example 3-2-2, all scheduled TBs may be allowed to be bundled when the interleaving transmission pattern is applied, whereas the scheduled TBs may be sub-grouped, and HARQ-ACK bundling may be performed for each sub-group when the interleaving transmission pattern is not applied. For example, when the total number of TBs scheduled through DCI is N and the interleaving transmission pattern is not applied, the N TBs may be grouped into M sub-groups, and ACK/NACK information of TBs included in each sub-group may be defined to be included in the HARQ-ACK bundling transmission corresponding to the sub-group. As a result, the UE performs transmission of a total of M pieces of HARQ-ACK bundling information. In contrast, when the total number of TBs scheduled through DCI is N and the interleaving transmission pattern is applied, all ACK/NACK information for the N TBs is bundled, and the UE performs transmission of a single piece of HARQ-ACK bundling information.

When the interleaving transmission pattern is applied, the radio channel environments that the TBs undergo are highly likely to be similar to each other. Accordingly, the method of Example 3-2-2 may be intended to increase the gain of HARQ-ACK bundling by increasing the number of bundled TBs. In contrast, when the interleaving transmission pattern is not applied, the method may be intended to reduce unnecessary retransmissions that may occur when ACK/NACK information differs between the bundled TBs.

Example 3-2-3

As a specific example of Method 3-2, in a system in which MTC or NB-IoT is used, the size of HARQ-ACK bundling may be defined to be determined according to the interleaving transmission pattern as in Option 3-2-2. Here, the interleaving transmission pattern refers to a pattern in which alternate transmission of TBs is performed. For example, when the interleaving transmission pattern is applied to a plurality of TB transmissions to which repetition is applied, a period in which the same TB is repeatedly transmitted may be changed according to the number of scheduled TBs. When there is a plurality of interleaving transmission patterns, and the UE may expect one interleaving transmission pattern by an explicit or implicit indication from the base station, the size of the bundling may be defined to conform to the indicated interleaving transmission pattern.

Example 3-2-4

As a specific example of Method 3-2, in a system in which MTC or NB-IoT is used, the size of the bundling may be defined to be determined according to the number of TBs scheduled by DCI as in Option 3-2-3. As a specific method, when the application of HARQ-ACK bundling is allowed, the size of the bundling may be defined to be changed according to the number of TBs scheduled by the DCI.

Figure 25:
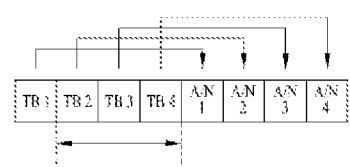
FIG. 25 illustrates a method for performing HARQ-ACK bundling according to an embodiment of the present disclosure.
Figure 25:
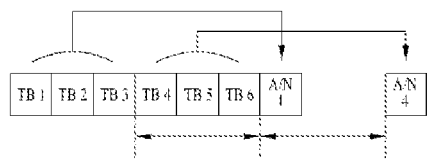
Figure 25:
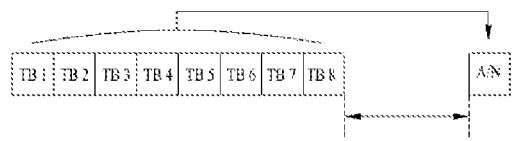

As an example of the specific method of Example 3-2-4, when a structure in which the transmission of HARQ-ACK bundling is performed after a fixed scheduling delay from the time when transmission of a TB is completed is used, the method of determining the bundling size according to the number of scheduled TBs may be defined to be determined based on whether the HARQ-ACK feedback channel corresponding to a TB overlaps with transmission of another TB. A structure in which the example of the specific method operates is illustrated in FIG. 25. In the example of FIG. 19, the scheduling delay between transmission of a TB and HARQ-ACK transmission is fixed to 3 ms. In this case, when the number of scheduled TBs is less than or equal to 4, the HARQ-ACK feedback transmission time corresponding to each TB does not overlap with the transmission time of other TBs, and therefore each independent individual HARQ-ACK feedback transmission may be applied (e.g. FIG. 25(a)). However, when the number of scheduled TBs is greater than 4 (e.g., FIG. 25(b)) while the scheduling delay of 3 ms is maintained, transmission of a TB may be scheduled at the time of HARQ-ACK feedback transmission corresponding to some other TBs. In this case, in order not to cause an additional HARQ-ACK transmission delay while maintaining the scheduling delay rule, TBs may be grouped into sub-groups and HARQ-ACK bundling may be performed on each sub-group. For example, when 6 TBs are scheduled, two sub-groups may be formed by grouping every three TBs into one sub-group, and the transmission time of HARQ-ACK bundling information of each sub-group may be determined based on the time when transmission of the sub-group is completed (e.g., FIG. 25(b)). When the sub-grouping is applied as described above, the number of TBs included in the sub-groups may be determined as equally as possible in order to maintain the transmission/reception occasions and performances of the TBs as equally as possible. From this point of view, in a situation of partial scheduling as shown in FIG. 25(c), HARQ-ACK information for all TBs may be bundled into one HARQ-ACK.

Example 3-2-5

As a specific example of Method 3-2, in a system in which MTC or NB-IoT is used, when HARQ-ACK feedback transmissions for different TBs overlap each other based on a transmission method for the individual HARQ-ACK feedbacks as in Option 3-2-4, overlapping HARQ-ACK feedbacks may be bundled.

Figure 26:
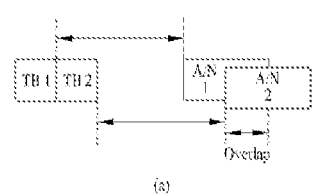
FIG. 26 illustrates a method for performing HARQ-ACK bundling according to another embodiment of the present disclosure.
Figure 26:
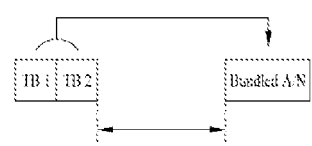

The method proposed in Example 3-2-5 may be applied particularly when the transmission duration of a HARQ- ACK feedback is longer than the transmission duration of the TB. Specifically, for a system to which repetition is applied, there may be a case where the scale of the repetition applied to the HARQ-ACK feedback transmission is larger than the scale of the repetition applied to the TB. In this case, the UE may fail to perform two HARQ-ACK transmissions simultaneously. FIG. 26(a) illustrates the issue of such overlapping of HARQ-ACK transmissions. In order to prevent this issue, when HARQ-ACK feedback transmissions corresponding to two or more TBs partially (or fully) overlap with each other, HARQ-ACK bundling may be defined to be applied to the TBs corresponding to the overlapping HARQ-ACK feedback transmissions (e.g. FIG. 26(b)).

Example 3-2-6

As a specific example of Method 3-2, in a system in which MTC or NB-IoT is used, a different bundling application scheme may be used depending on whether the duplex mode of the UE is full duplex-FDD (FD-FDD), half duplex-FDD (HD-FDD), or TDD as in Option 3-2-5. In this case, the application scheme may be the application status of bundling, or if bundling is applied, the size of bundling.

As an example of the method proposed in Example 3-2-6, in the case of FD-FDD, the bundling may be defined to be applied only in a limited situation (e.g. HARQ-ACK feedback transmission resources overlap each other and/or an interleaving transmission pattern is applied). This may be because in the FD-FDD structure, the UE may transmit a HARQ-ACK feedback in the UL direction while receiving a TB in the DL direction, and thus bundling support may not be required.

As an example of the method proposed in Example 3-2-6, in the case of HD-FDD, it may be defined to include all the bundling application conditions supported by the FD-FDD and to include an additional bundling application condition. As an example, the additional bundling condition may include a method of determining the application status according to the number of scheduled TBs and/or the scale of repetition. In the case of HD-TDD, the UE may not be capable of simultaneously processing reception on DL and transmission on UL, and thus may not be allowed to send a HARQ-ACK feedback while receiving a TB. To address this issue, a method for supporting HARQ-ACK bundling may be needed.

As an example of the method proposed in Example 3-2-6, in the case of TDD, all the conditions for applying bundling supported by HD-FDD may be defined to be included, and additional conditions for applying the bundling may be defined to be included. The structure of TDD has a similarity to HD-FDD in that DL reception and UL transmission may not be processed at the same time. Accordingly, to address a similar issue, the same bundling conditions as in HD-FDD may be applied. In addition, in the TDD structure, a UL subframe and a DL subframe alternate, and the constraint of the scheduling delay differs among the UL/DL configurations. Therefore, in the TDD, the method of applying bundling may be changed according to the condition for the UL/DL configuration.

Figure 27:
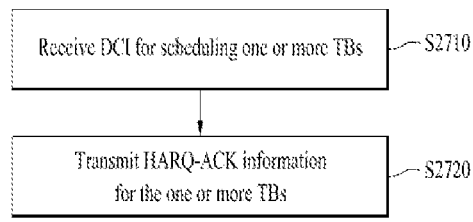
FIG. 27 is a flowchart of a method according to the present disclosure carried out by a terminal.

FIG. 27 is a flowchart of a method according to the present disclosure carried out by a terminal.

A terminal may receive DCI indicating one or more TBs from a base station (S2702). For example, the DCI may indicate multiple-TB and may be repeatedly received through a physical signal/channel (e.g., PDCCH, MPDCCH, NPDCCH, etc.). In addition, the terminal may receive the one or more TBs from the base station based on the received DCI. For example, the one or more TBs may be repeatedly received through a physical signal/channel (e.g., PDSCH, NPDSCH, etc.).

The terminal may transmit HARQ-ACK information for the received one or more TBs (S2704). For example, a HARQ-ACK transmission scheme may be defined based on one or a combination of two or more of the methods proposed in the present disclosure (e.g., Method 1-1 to Method 1-6, Method 2-1 to Method 2-2, Method 3-1 to Method 3-2).

As an example, when 3-2 of the present disclosure is applied, the terminal may perform HARQ-ACK bundling for transmission of the HARQ-ACK information when a specific condition is satisfied. The specific condition has been described in detail in Method 3-2, and the entire description of Method 3-2 is incorporated herein by reference.

As a more specific example, the specific condition may include a condition that a plurality of TBs is received in an alternating manner. When the plurality of TBs is received in an alternating manner, HARQ-ACK bundling is applied for transmission of the HARQ-ACK information. When the plurality of TBs is not received in the alternating manner, HARQ-ACK bundling is not applied for transmission of the HARQ-ACK information (e.g., see Option 3-2-1).

As another specific example, the specific condition may include a condition that the number of the plurality of TBs is greater than a specific number. When the number of the plurality of TBs is less than or equal to the specific number, the HARQ-ACK information includes individual HARQ-ACK responses to the plurality of TBs. When the number of the plurality of TBs is greater than the specific number, the HARQ-ACK information is generated by applying HARQ-ACK bundling. Here, the specific number may be 4 (e.g., see Option 3-2-3).

As another specific example, the specific condition may include a condition that HARQ-ACK transmission time intervals for different TBs among the plurality of TBs overlap each other. When HARQ-ACK transmission time intervals for different TBs among the plurality of TBs overlap each other, the HARQ-ACK information is generated by applying HARQ-ACK bundling. When HARQ-ACK transmission time intervals for different TBs among the plurality of TBs do not overlap each other, the HARQ-ACK information is generated without applying HARQ-ACK bundling (e.g., see Option 3-2-4).

The method carried out by the terminal includes the methods proposed in the present disclosure and combinations thereof by reference.

Figure 28:
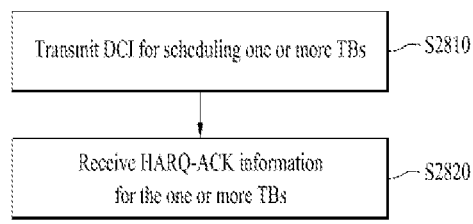
FIG. 28 is a flowchart of a method according to the present disclosure carried out by a base station.

FIG. 28 is a flowchart of a method according to the present disclosure carried out by a base station.

A base station may transmit DCI indicating one or more TBs to a terminal (e.g., UE) (S2802). For example, the DCI may indicate multiple-TB and may be repeatedly transmitted through a physical signal/channel (e.g., PDCCH, MPDCCH, NPDCCH, etc.). In addition, the base station may transmit the one or more TBs to the terminal based on the transmitted DCI. For example, the one or more TBs may be repeatedly transmitted through a physical signal/channel (e.g., PDSCH, NPDSCH, etc.).

The base station may receive HARQ-ACK information for the one or more transmitted TBs (S2804). For example, a HARQ-ACK reception scheme may be defined based on one or a combination of two or more of the methods proposed in the present disclosure (e.g., Method 1-1 to Method 1-6, Method 3-1 to Method 3-2, Method A-1 to Method A-2).

As an example, when 3-2 of the present disclosure is applied, the base station may receive HARQ-ACK information to which HARQ-ACK bundling is applied when a specific condition is satisfied. The specific condition is described in detail in Method 3-2, and the entire description of Method 3-2 is incorporated herein by reference. As a more specific example, the specific condition may include a condition that a plurality of TBs is transmitted in an alternating manner. When the plurality of TBs is transmitted in an alternating manner, HARQ-ACK information to which HARQ-ACK bundling is applied is received. When the plurality of TBs is not transmitted in the alternating manner, HARQ-ACK information to which HARQ-ACK bundling is not applied is received (e.g., see Option 3-2-1).

As another specific example, the specific condition may include a condition that the number of the plurality of TBs is greater than a specific number. When the number of the plurality of TBs is less than or equal to the specific number, the HARQ-ACK information includes individual HARQ-ACK responses to the plurality of TBs. When the number of the plurality of TBs is greater than the specific number, the HARQ-ACK information is generated by applying HARQ-ACK bundling. Here, the specific number may be 4 (e.g., see Option 3-2-3).

As another specific example, the specific condition may include a condition that HARQ-ACK transmission time intervals for different TBs among the plurality of TBs overlap each other. When HARQ-ACK transmission time intervals for different TBs among the plurality of TBs overlap each other, the HARQ-ACK information is generated by applying HARQ-ACK bundling. When HARQ-ACK transmission time intervals for different TBs among the plurality of TBs do not overlap each other, the HARQ-ACK information is generated without applying HARQ-ACK bundling (e.g., see Option 3-2-4).

The method carried out by the base station includes the methods proposed in the present disclosure and combinations thereof by reference.

7. Examples of a Communication System to which the Present Disclosure is Applied Various descriptions, functions, procedures, proposals, methods and/or operational flowcharts of the present disclosure disclosed in this document are applicable, but limited, to various fields requiring wireless communication/connection (e.g., 5G) between devices.

Hereinafter, examples will be illustrated in more detail with reference to the drawings. In the following drawings/description, the same reference numerals may exemplify the same or corresponding hardware blocks, software blocks, or functional blocks, unless otherwise indicated.

Figure 29:
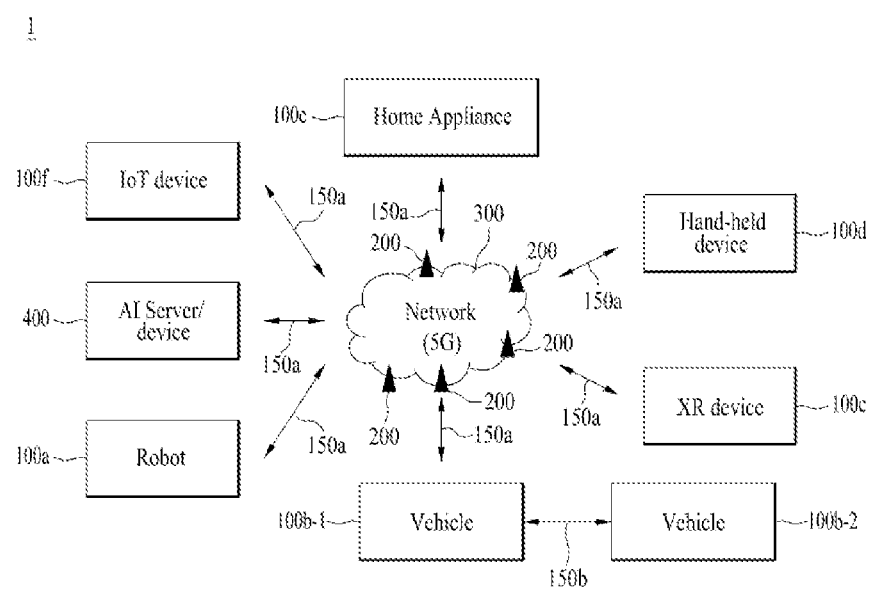
FIG. 29 illustrates a communication system 1 applied to the present disclosure.

FIG. 29 illustrates a communication system 1 applied to the present disclosure.

Referring to FIG. 29, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

8. Examples of Wireless Devices to which the Present Disclosure is Applied

Figure 30:
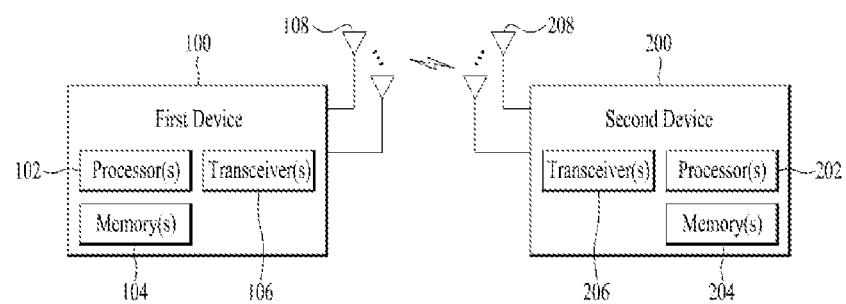
FIG. 30 illustrates a wireless device applicable to the present disclosure.

FIG. 30 illustrates a structure of a wireless device to which the methods proposed in the present disclosure are applicable.

Referring to FIG. 30, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

9. Use Cases of Wireless Devices to which the Present Disclosure is Applied

Figure 31:
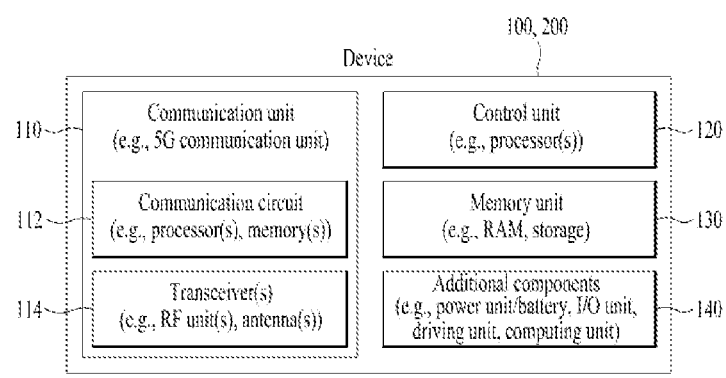
FIG. 31 shows another example wireless device applied to the present disclosure.

FIG. 31 shows another example wireless device applied to the present disclosure. The wireless device may be implemented in various forms according to use cases/services (see FIG. 29).

Referring to FIG. 31, the wireless devices 100 and 200 correspond to the wireless devices 100 and 200 of FIG. 30, and may be composed of various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 30. For example, the transceiver(s) 114 may include the one or more transceivers 106 and 206 and/or one or more antennas 108 and 208 of FIG. 30. The control unit 120 is electrically connected to the communication unit 110, the memory unit 130, and the additional components 140 and controls overall operations of the wireless devices. For example, the controller 120 may control the electrical/mechanical operation of the wireless device based on the programs/code/commands/information stored in the memory unit 130. In addition, the control unit 120 may transmit the information stored in the memory unit 130 to an external part (e.g., another communication device) via the communication unit 110 through a wireless/wired interface, or store, in the memory unit 130, information received through the wireless/wired interface from an external part (e.g., another communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 31, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire, and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphics processor, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Hereinafter, an example implementation of FIG. 31 will be described in detail with reference to the drawings.

Figure 32:
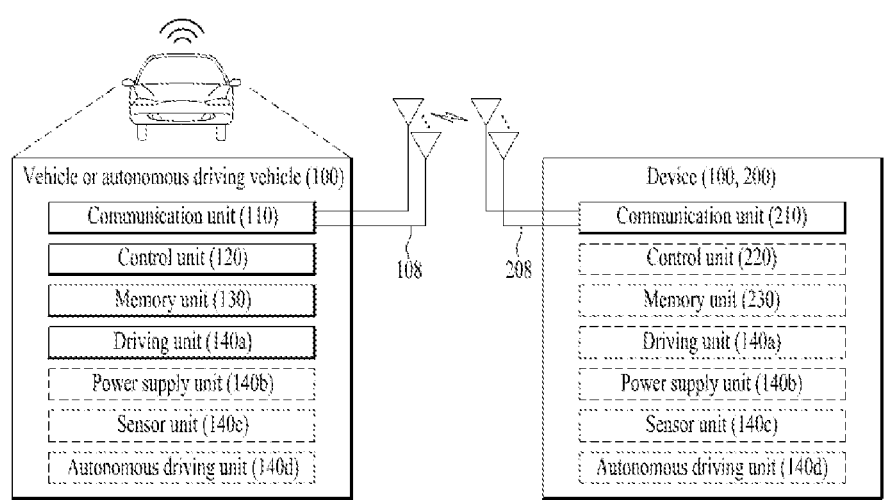
FIG. 32 illustrates a vehicle or an autonomous driving vehicle applied to the present disclosure.

10. Examples of Vehicles or Autonomous Vehicles to which the Present Disclosure is Applied FIG. 32 illustrates an example vehicle or autonomous driving vehicle applied to the present disclosure. The vehicle or autonomous driving vehicle may be implemented as a mobile robot, a vehicle, a train, a manned/unmanned aerial vehicle (AV), or a ship.

Referring to FIG. 32, the vehicle or autonomous driving vehicle 100 may include an antenna unit 108, a communication unit 110, a control unit 120, a driving unit 140a, a power supply unit 140b, and a sensor unit 140c, and an autonomous driving unit 140d. The antenna unit 108 may be configured as a part of the communication unit 110. Blocks 110/130/140a to 140d correspond to the blocks 110/130/140 of FIG. 31, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

11. AR/VR and Vehicle Examples to which the Present Disclosure is Applied

Figure 33:
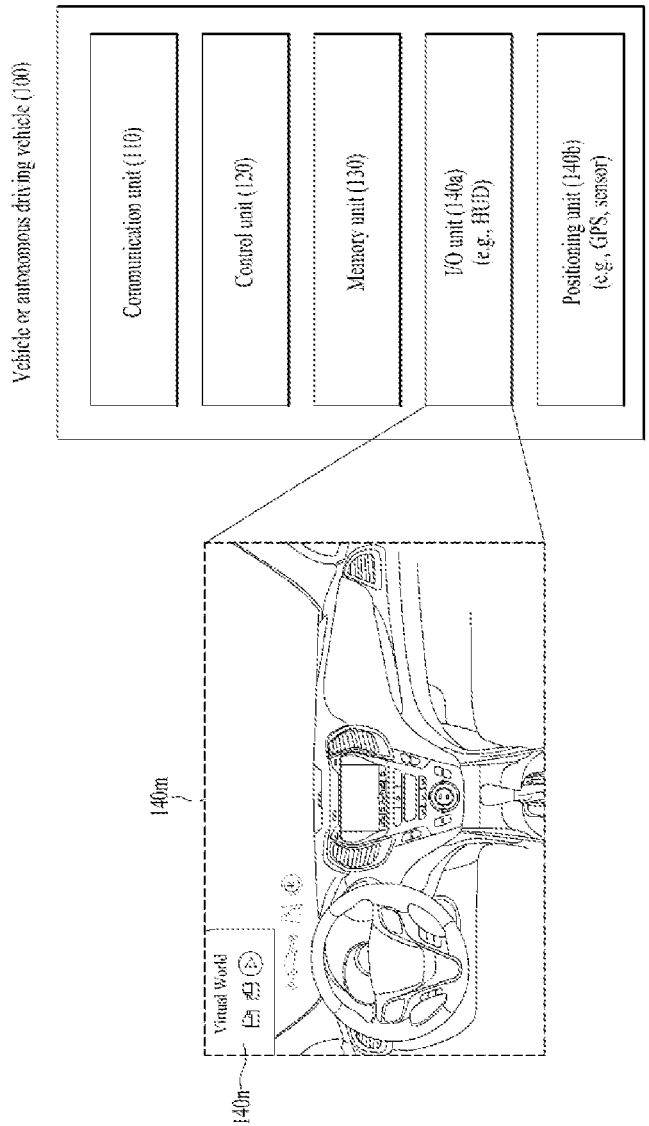
FIG. 33 illustrates an AR/VR and a vehicle applied to the present disclosure.

FIG. 33 illustrates a vehicle applied to the present disclosure. The vehicle may also be implemented as a transportation means, a train, an aircraft, or a ship.

Referring to FIG. 33, the vehicle 100 may include a communication unit 110, a control unit 120, a memory unit 130, an input/output unit 140a, and a positioning unit 140b. Here, blocks 110 to 130/140a to 140b correspond to the blocks 110 to 130/140 of FIG. 31, respectively.

The communication unit 110 may transmit and receive signals (e.g., data, control signals, etc.) to and from other vehicles or external devices such as a base station. The controller 120 may perform various operations by controlling the components of the vehicle 100. The memory unit 130 may store data/parameters/programs/codes/commands supporting various functions of the vehicle 100. The input/output unit 140a may output an AR/VR object based on information in the memory unit 130. The input/output unit 140a may include a HUD. The positioning unit 140b may acquire location information about the vehicle 100. The location information may include absolute location information about the vehicle 100, location information within a driving lane, acceleration information, and location information with respect to nearby vehicles. The positioning unit 140b may include a GPS and various sensors.

As an example, the communication unit 110 of the vehicle 100 may receive map information, traffic information, and the like from an external server and store the same in the memory unit 130. The positioning unit 140b may acquire vehicle location information through the GPS and various sensors and store the vehicle location information in the memory unit 130. The control unit 120 may generate a virtual object based on the map information, traffic information, vehicle location information, and the like, and the input/output unit 140a may display the generated virtual object on the inner side of the windshield of the vehicle. In addition, the controller 120 may determine whether the vehicle 100 is operating normally within a driving lane based on the vehicle location information. When the vehicle 100 abnormally deviates from the driving lane, the control unit 120 may display a warning on the windshield of the vehicle through the input/output unit 140a. In addition, the controller 120 may broadcast a warning message about a driving abnormality to nearby vehicles through the communication unit 110. Depending on the situation, the controller 120 may transmit location information about the vehicle and information about driving/vehicle abnormalities to a related organization through the communication unit 110.

Figure 34:
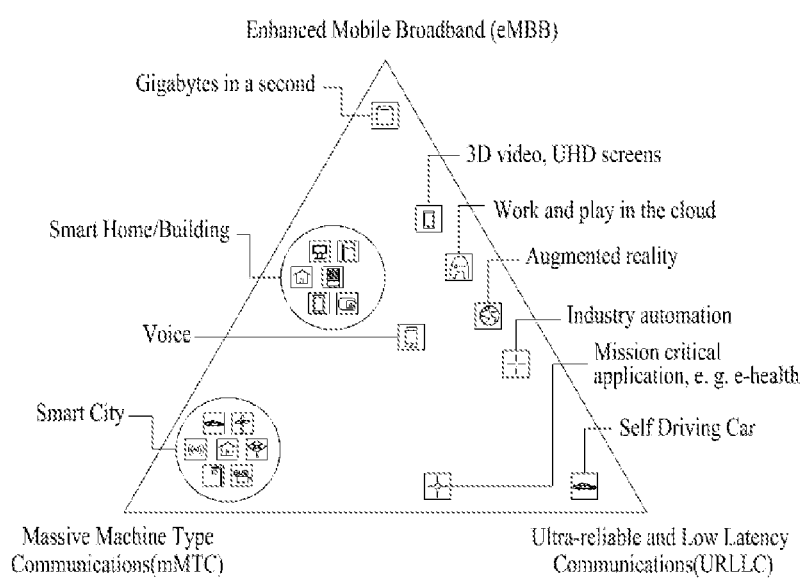
FIG. 34 illustrates a 5G scenario applicable to the present disclosure.

FIG. 34 illustrates an example 5G use scenario to which the technical features of the present disclosure may be applied. The 5G use scenario shown in FIG. 34 is merely exemplary, and the technical features of the present disclosure may also be applied to other 5G use scenarios which are not shown in FIG. 34.

Referring to FIG. 34, three main requirements areas of 5G include (1) enhanced mobile broadband (eMBB) area, (2) massive machine type communication (mMTC) area and (3) ultra-reliable and low latency communications (URLLC) area. Some use cases may require multiple areas for optimization, and other use cases may be focused only on a key performance indicator (KPI). 5G supports such various use cases in a flexible and reliable way.

eMBB focuses on the overall improvement of data rate, latency, user density, capacity and coverage of mobile broadband access. eMBB targets a throughput of around 10 Gbps. eMBB surpasses basic mobile Internet access and covers abundant interactive work, media and entertainment applications in the cloud or augmented reality. Data is one of the key drivers of 5G, and dedicated voice services may be eliminated for the first time in the 5G era. In 5G, voice is expected to be processed as an application simply using a data connection provided by a communication system. A main cause of the increased traffic volume is an increase in content size and an increase in the number of applications requiring high data rates. Streaming services (audio and video) and interactive video and mobile Internet connections will become more prevalent as more devices connect to the Internet. Many of these applications require always-on connectivity to push real-time information and notifications to the user. Cloud storage and applications are rapidly increasing in mobile communication platforms, which may be applied to both work and entertainment. Cloud storage is a special use case that drives the growth of uplink data rates.

5G is also used for remote work on the cloud, and requires much lower end-to-end latency to maintain a good user experience when tactile interfaces are used. In entertainment, for example, cloud gaming and video streaming are another key factor that increases the demand for mobile broadband capabilities. Entertainment is essential on smartphones and tablets in any place, including highly mobile environments such as trains, cars and airplanes. Another use case is augmented reality and information retrieval for entertainment. Here, augmented reality requires very low latency and an instantaneous amount of data.

mMTC is designed to enable communication between a large number of low-cost devices powered by batteries, and is intended to support applications such as a smart meter, logistics, field and body sensors. The mMTC targets batteries and/or 1 million units per square kilometer in about 10 years. mMTC enables seamless connection of embedded sensors in all fields and is one of the 5G use cases that are anticipated most. Potentially, IoT devices are expected to reach 20.4 billion devices by 2020. Industrial IoT is one of the areas where 5G plays a major role in enabling smart cities, asset tracking, smart utilities, agriculture and security infrastructure.

URLLC allows devices and machines to communicate very reliably and with very low latency and high availability, and is thus ideal for vehicle communication, industrial control, factory automation, telesurgery, smart grid and public safety applications. URLLC aims for a latency of about 1 ms. URLLC includes a new service that will transform the industry through ultra-reliable/low-latency links such as remote control of main infrastructure and autonomous vehicles. The level of reliability and latency is essential for smart grid control, industrial automation, robotics, drone control and coordination.

Next, a number of use cases included in the triangle of FIG. 34 will be described in detail.

5G may complement fiber-to-the-home (FTTH) and cable-based broadband (or DOCSIS) by means for providing streams rated from hundreds of megabits per second to gigabits per second. Such high speed may be required to deliver TV at a resolution of 4K or higher resolution (6K, 8K and higher) as well as virtual reality (VR) and augmented reality (AR). VR and AR applications involve almost immersive sports events. A specific application may require a special network configuration. For example, in the case of VR games, the game company may need to integrate the core server with the edge network server of a network operator to minimize latency.

Automotive is expected to be an important new driving power in 5G, with many use cases for mobile communication for vehicles. For example, entertainment for passengers requires high capacity and high mobile broadband simultaneously. The reason is that future users will continue to expect high-quality connections, regardless of their location and speed. Another use case in the automotive sector is an augmented reality dashboard. The augmented reality dashboard allows the driver to identify objects in the dark on top of what they see through the windshield. The augmented reality dashboard displays information in overlapping manner to inform the driver of the distance and movement of objects. In the future, wireless modules will enable communication between vehicles, exchange of information between a vehicle and a supporting infrastructure, and exchange of information between a vehicle and other connected devices (e.g., devices carried by pedestrians). A safety system may lower the risk of accidents by guiding the driver through alternative courses of action to make driving safer. The next step will be a remotely controlled vehicle or an autonomous vehicle. This requires very reliable and very fast communication between different autonomous vehicles and/or between vehicles and infrastructure. In the future, autonomous vehicles will perform all driving activities, and drivers will be allowed to focus only on traffic anomalies that the vehicle is unable to identify. The technical requirements of autonomous vehicles demand ultra-low latency and ultra-fast reliability to increase traffic safety to levels that cannot be achieved by humans.

Smart cities and smart homes referred to as smart society will be embedded with high-density wireless sensor networks. A distributed network of intelligent sensors will identify the conditions for cost and energy efficient maintenance of a city or home. A similar setup may be carried out for each household. Temperature sensors, window and heating controllers, burglar alarms and home appliances are all wirelessly connected. Many of these sensors typically require low data rates, low power and low cost. However, for example, real-time HD video may be required in specific types of devices for surveillance.

The consumption and distribution of energy including heat or gas is highly decentralized, requiring automated control of distributed sensor networks. The smart grid interconnects these sensors using digital information and communication technologies to collect information and act accordingly. This information may include the behavior of suppliers and consumers, enabling the smart grid to improve efficiency, reliability, economics, sustainability of production and the distribution of fuels such as electricity in an automated manner. The smart grid may be considered as another low-latency sensor network.

The health sector has many applications that may benefit from mobile communications. The communication system may support remote medical treatment for providing clinical care from remote locations. This may help reduce distance related constraints and improve access to medical services that are not consistently available in remote rural areas. It is also used to save lives in critical care and emergencies. A wireless sensor network based on mobile communication may provide remote monitoring of parameters such as heart rate and blood pressure and sensors therefor.

Wireless and mobile communications are becoming increasingly important in industrial applications. Wiring requires high installation and maintenance costs. Thus, the possibility of replacing cables with reconfigurable wireless links is an attractive opportunity for many industrial fields. However, achieving this requires that the wireless connection operate with a latency, reliability and capacity similar to those of the cable, and its management is simplified. Low latency and very low error rate are new requirements that need to be connected with 5G.

Logistics and cargo tracking are important use cases for mobile communications that enables tracking of inventory and packages from anywhere using a location-based information system. The use cases of logistics and cargo tracking typically require low data rates, but require a wide range and reliable location information.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this document, embodiments of the present disclosure have been described mainly based on a signal transmission/reception relationship between a terminal and a base station. Such a transmission/reception relationship is applied to signal transmission/reception between a terminal and a relay or between a base station and a relay in in the same/similar manner. In some cases, a specific operation described in this document as being performed by the base station may be performed by an upper node thereof. That is, it is apparent that various operations performed for communication with a terminal in a network including a plurality of network nodes including a base station may be performed by the base station or network nodes other than the base station. The base station may be replaced with terms such as fixed station, Node B, eNode B (eNB), gNode B (gNB), access point, or the like. In addition, the terminal may be replaced with terms such as User Equipment (UE), Mobile Station (MS), Mobile Subscriber Station (MSS), or the like.

The examples of the present disclosure may be implemented through various means. For example, the examples may be implemented by hardware, firmware, software, or a combination thereof. When implemented by hardware, an example of the present disclosure may be implemented by one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more microcontrollers, one or more microprocessor, or the like.

When implemented by firmware or software, an example of the present disclosure may be implemented in the form of a module, a procedure, or a function that performs the functions or operations described above. Software code may be stored in a memory unit and executed by a processor. The memory unit may be located inside or outside the processor, and may exchange data with the processor by various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Various embodiments of the present disclosure are applicable to various wireless access systems. An example of various wireless access systems is a 3rd Generation Partnership Project (3GPP) or a 3GPP2 system. Various embodiments of the present disclosure are applicable not only to the various wireless access systems, but also to all technical fields to which the various wireless access systems are applied. Furthermore, the proposed methods are applicable to a mmWave communication system employing a very high frequency band.

The invention claimed is:

1. A method for transmitting a signal by a terminal in a wireless communication system, the method comprising:
receiving configuration information for scheduling multiple transport blocks (TBs);
receiving the multiple TBs based on the configuration information; and
transmitting HARQ-ACK information for the multiple TBs,
wherein HARQ-ACK bundling is determined to be used for the multiple TBs based on a number of the multiple TBs larger than 4, and
wherein the HARQ-ACK bundling is determined to be not used for the multiple TBs based on the number of the multiple TBs equal to or less than 4.

2. The method of claim 1,
wherein, based on the number of the multiple TBs larger than 4, the HARQ-ACK information includes one bit information generated by applying the HARQ-ACK bundling,
wherein, based on the number of the multiple TBs equal to or less than 4, the HARQ-ACK information includes individual HARQ-ACK responses to the multiple TBs.

3. The method of claim 1, wherein, based on the number of the multiple TBs being larger than 4, the HARQ-ACK information is generated by grouping the multiple TBs into a specific number of sub-groups and applying the HARQ-ACK bundling to each of the sub-groups.

4. The method of claim 1, wherein, based on the number of the multiple TBs being larger than 4, the HARQ-ACK information is generated by applying the HARQ-ACK bundling to an entirety of the multiple TBs.

5. A terminal for transmitting and receiving a signal in a wireless communication system, the terminal comprising:
a transceiver configured to receive or transmit a signal; and
a processor configured to control the transceiver,
wherein the processor is configured to:
receive information for scheduling a multiple transport blocks (TBs);
receive the multiple TBs based on the information; and
transmit HARQ-ACK information for the multiple TBs,
wherein HARQ-ACK bundling is determined to be used for the multiple TBs based on a number of the multiple TBs larger than 4, and
wherein the HARQ-ACK bundling is determined to be not used for the multiple TBs based on the number of the multiple TBs equal to or less than 4.

6. An apparatus for a user equipment (UE) for receiving a downlink signal in a wireless communication system, the apparatus comprising:
a memory containing executable code; and
a processor connected to the memory for operation,
wherein the processor is configured to execute the executable code to perform specific operations, the specific operations comprising:
receiving configuration information for scheduling a multiple transport blocks (TBs);
receiving the multiple TBs based on the configuration information; and
transmitting HARQ-ACK information for the multiple TBs, wherein HARQ-ACK bundling is determined to be used for the multiple TBs based on a number of the multiple TBs larger than 4, and wherein the HARQ-ACK bundling is determined to be not used for the multiple TBs based on the number of the multiple TBs equal to or less than 4.

7. The apparatus of claim 6, wherein the UE is capable of communicating with at least one of another UE, a UE related to an autonomous driving vehicle, a base station or a network.

* * * * *